O. WOODWARD.
TYPE WRITING MACHINE.
APPLICATION FILED JAN. 20, 1906.
927,626.
Patented July 13, 1909.
9 SHEETS—SHEET 7.
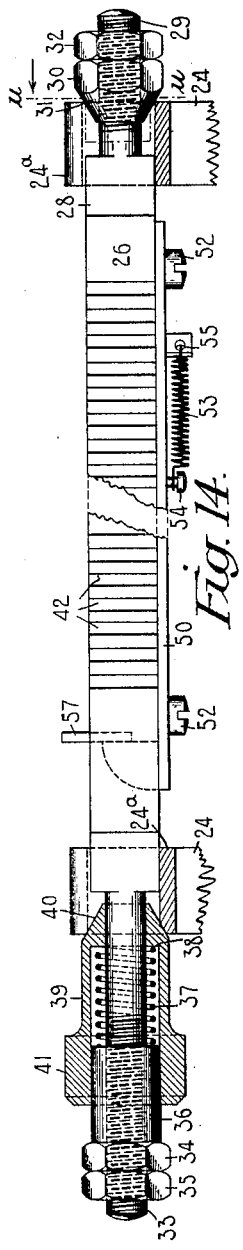
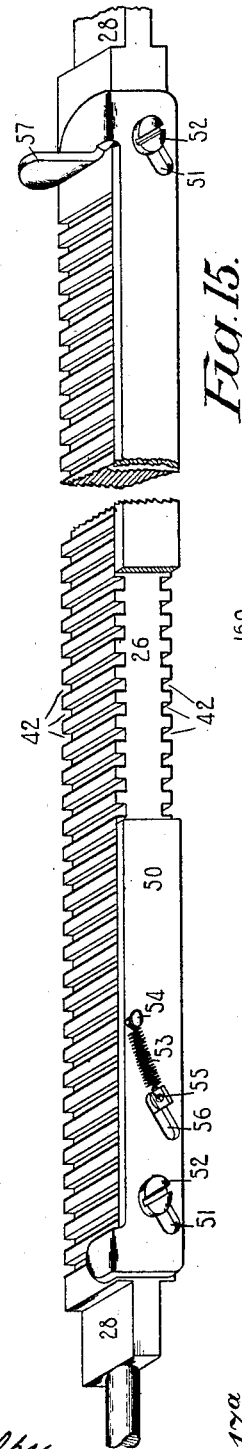
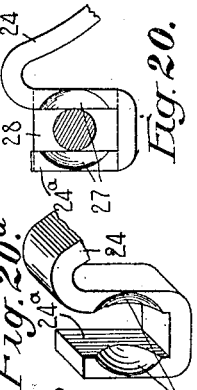
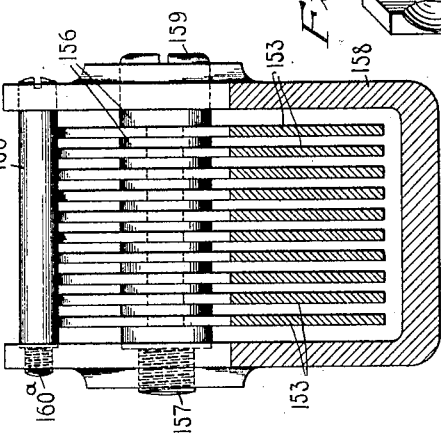
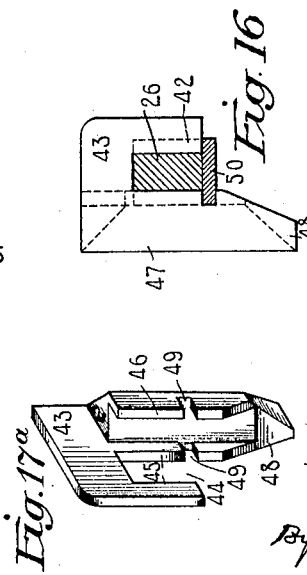
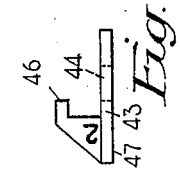
Witnesses
Joseph Phelps.
Charles E. Smith
Inventor:
Oscar Woodward
By Jacob Felbel
Attorney.

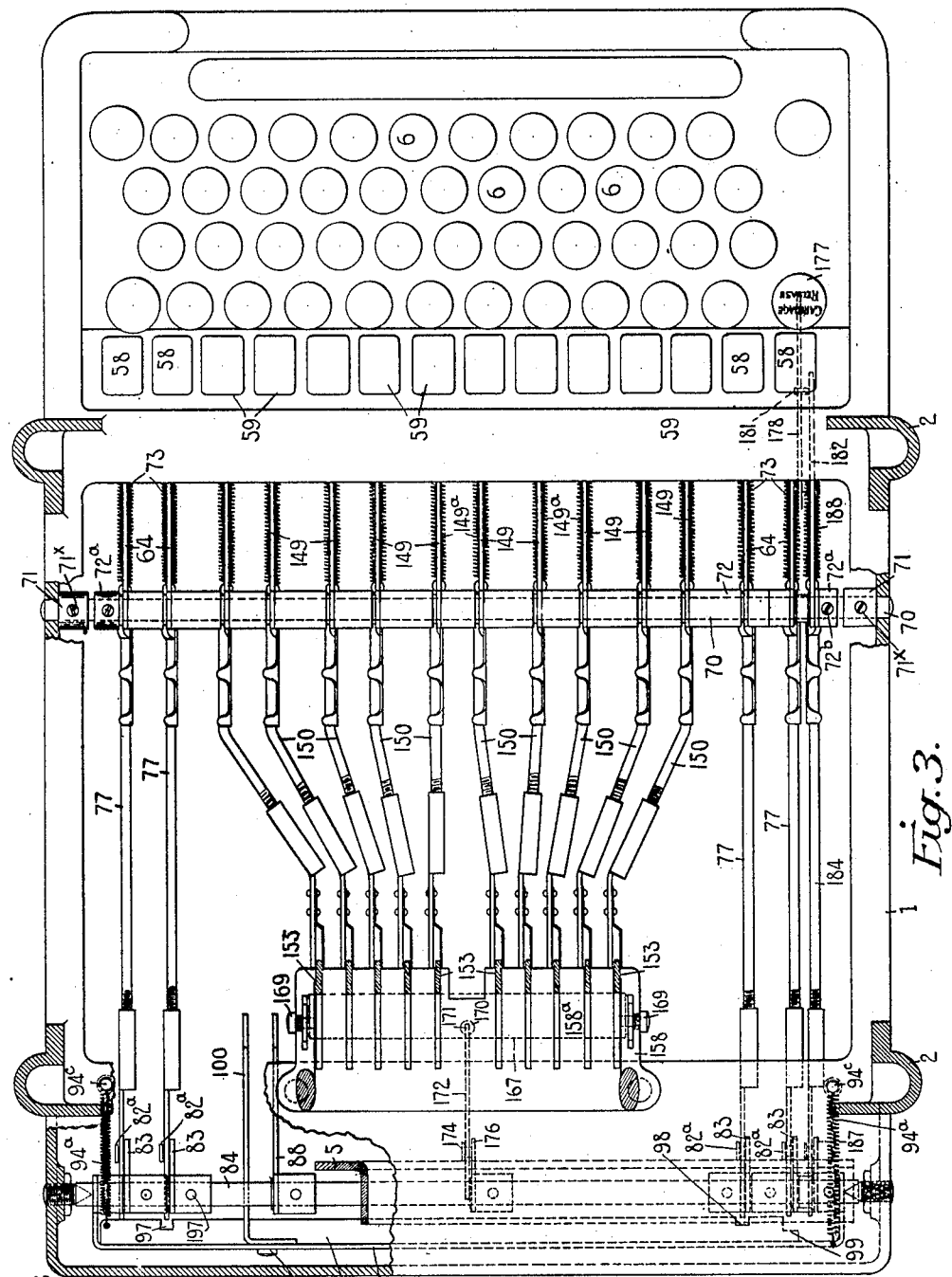

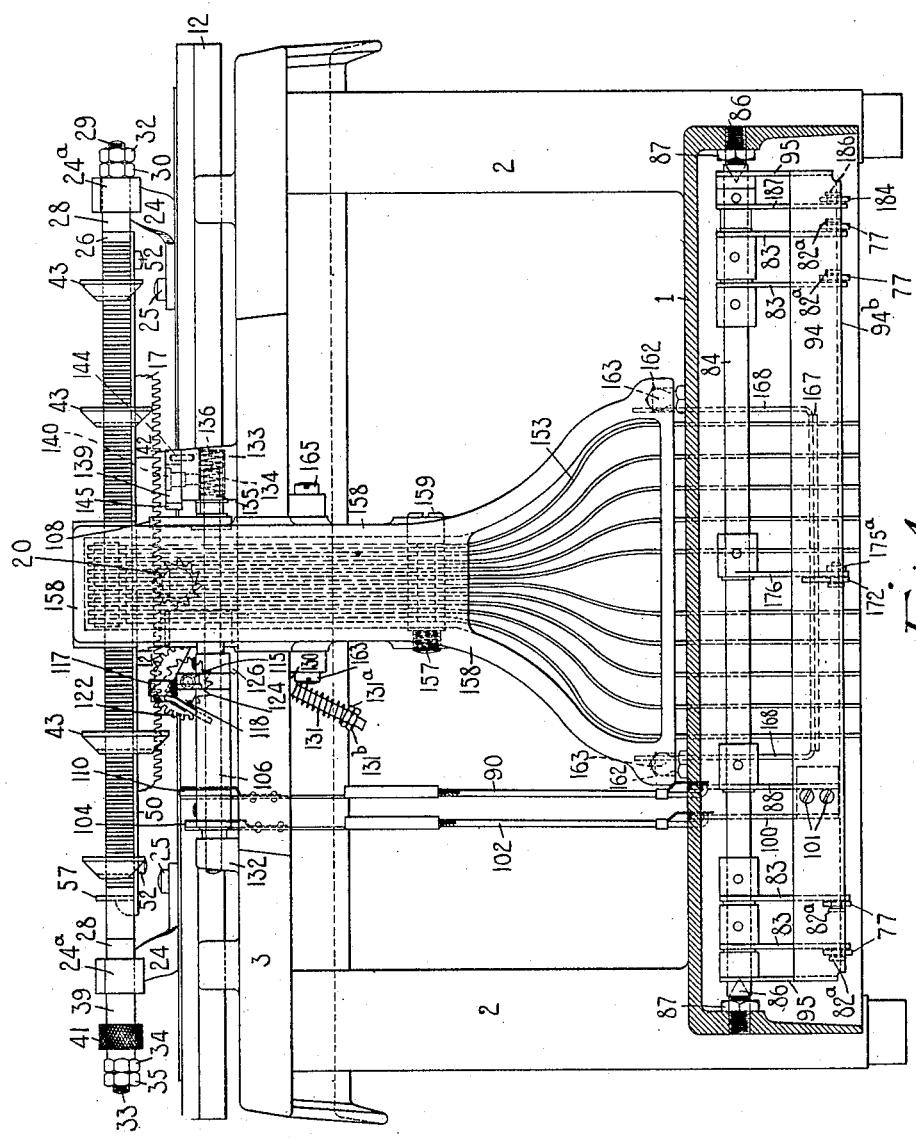

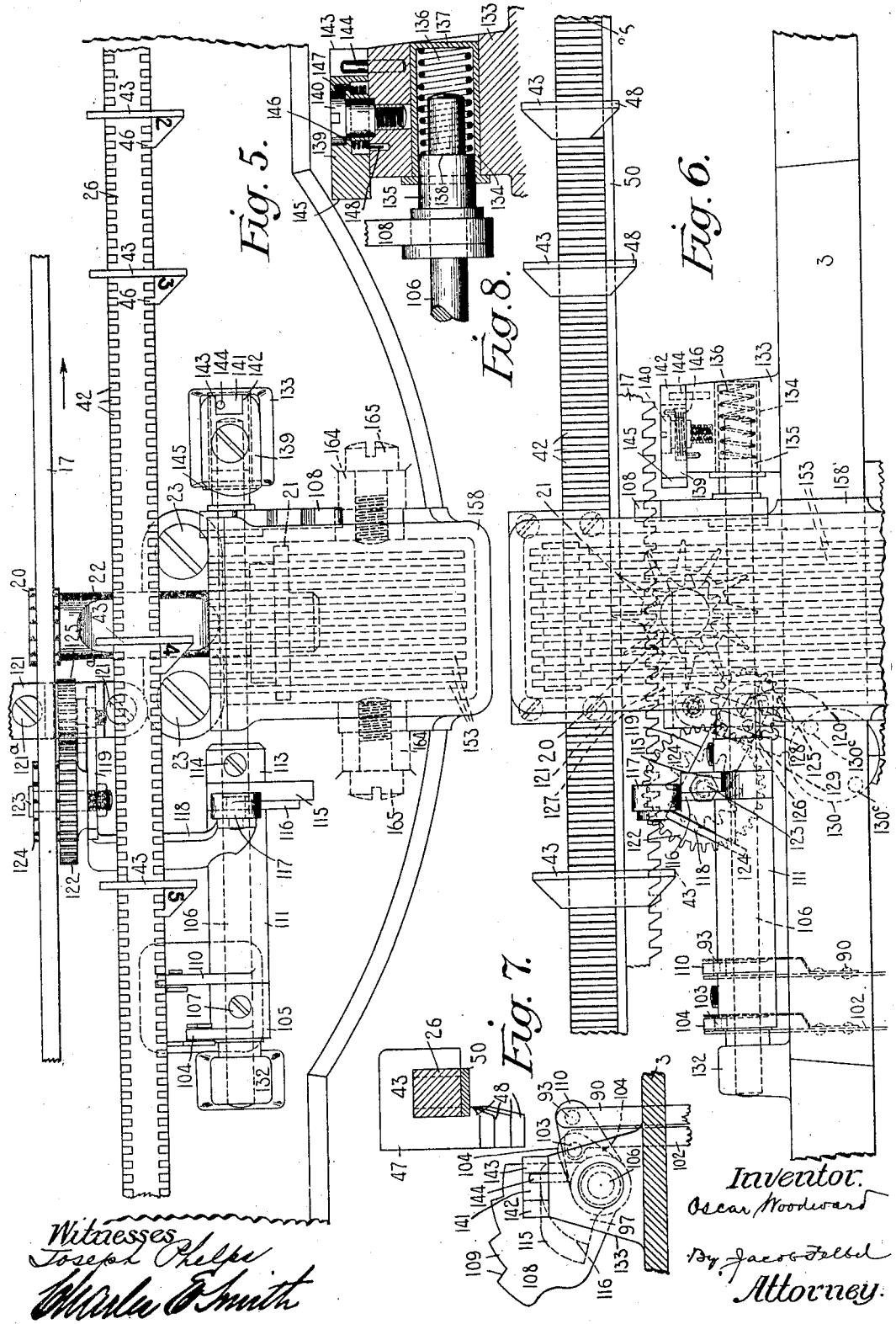

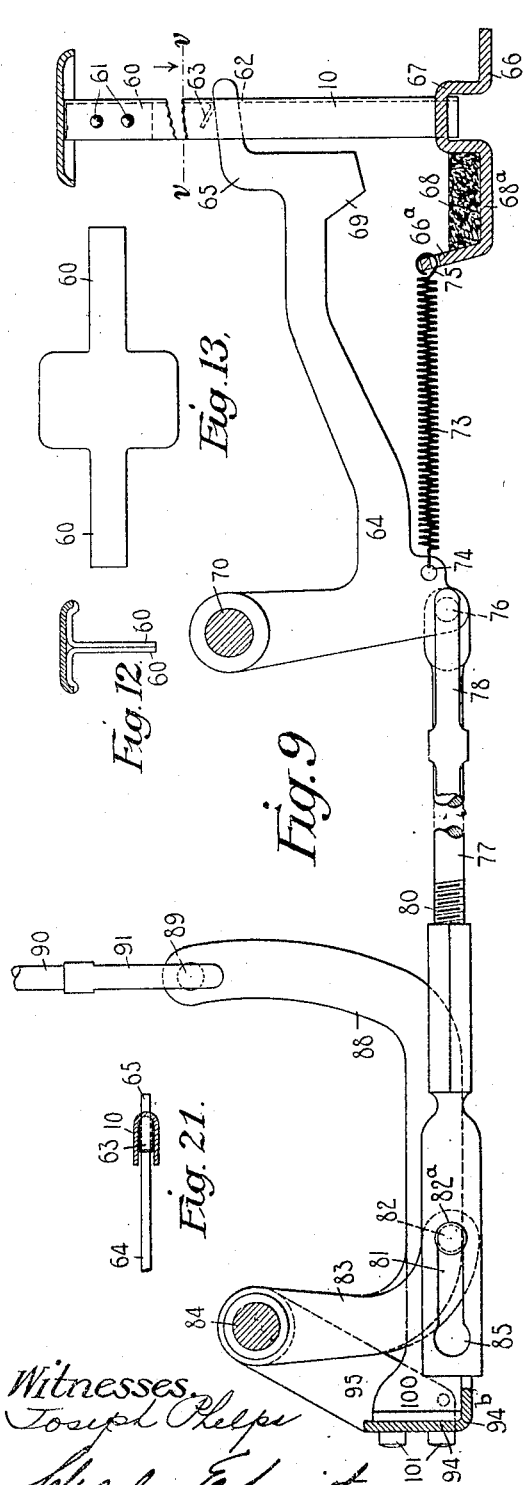
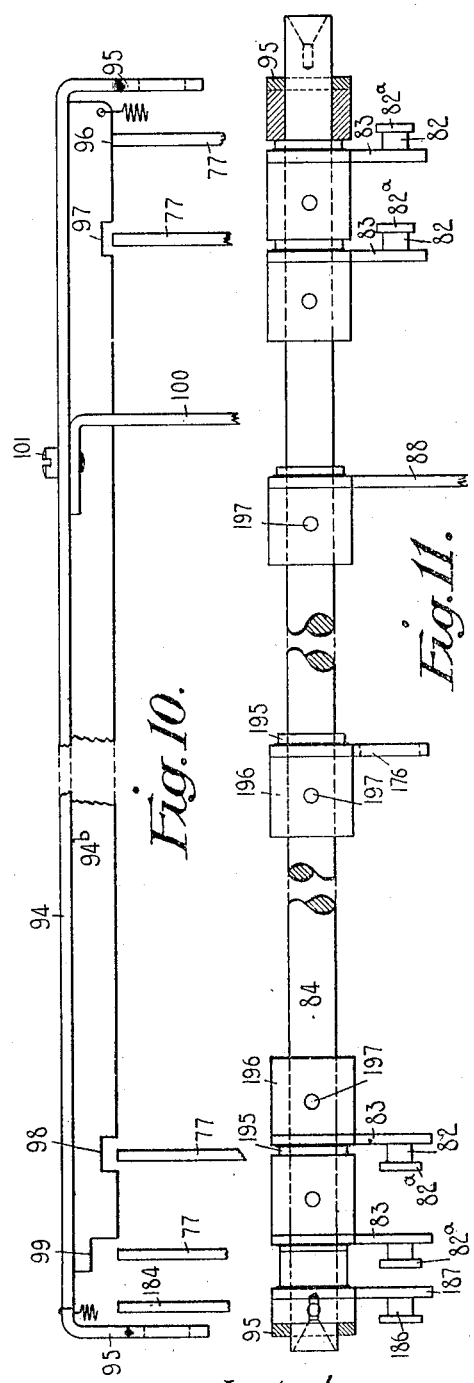

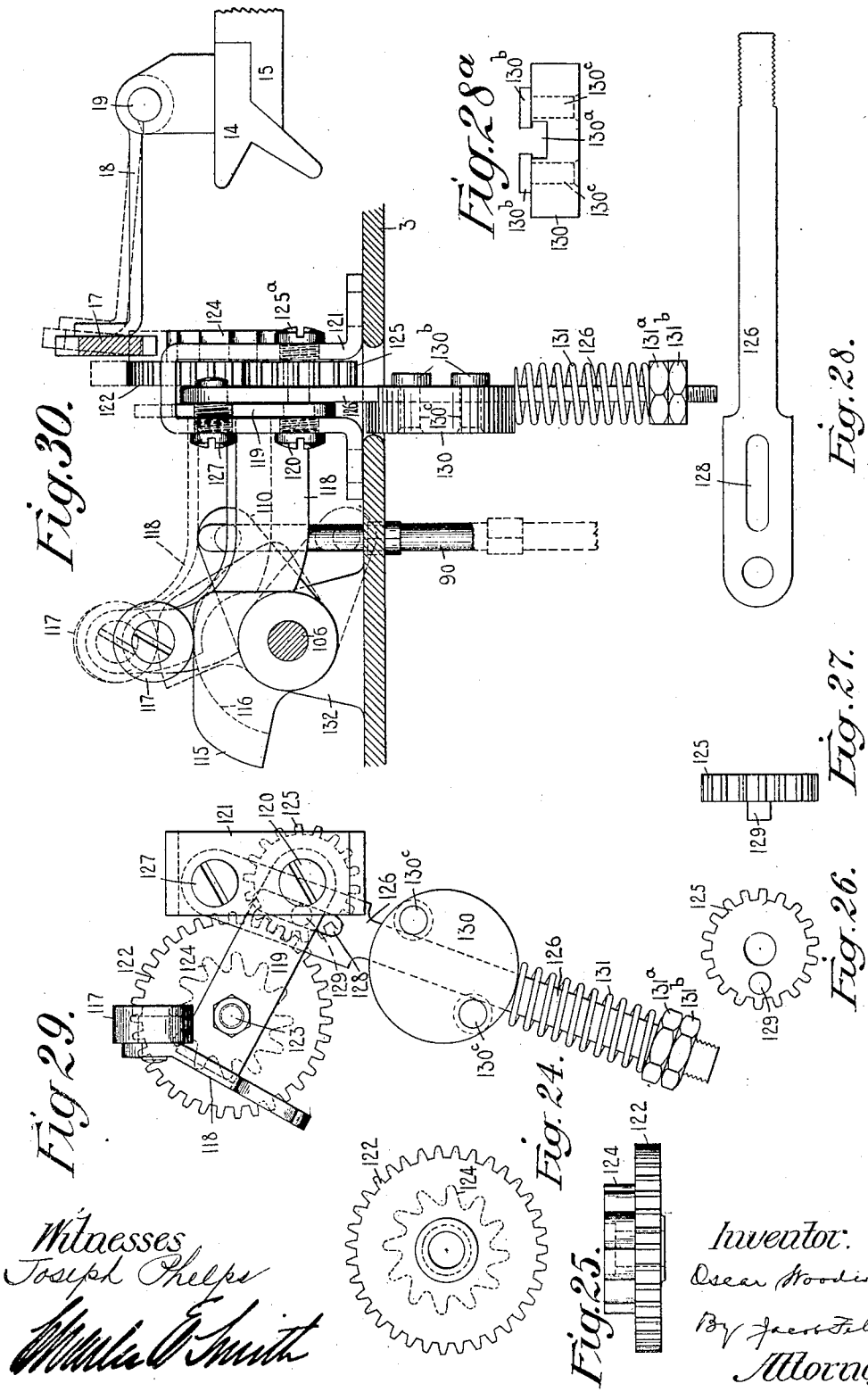

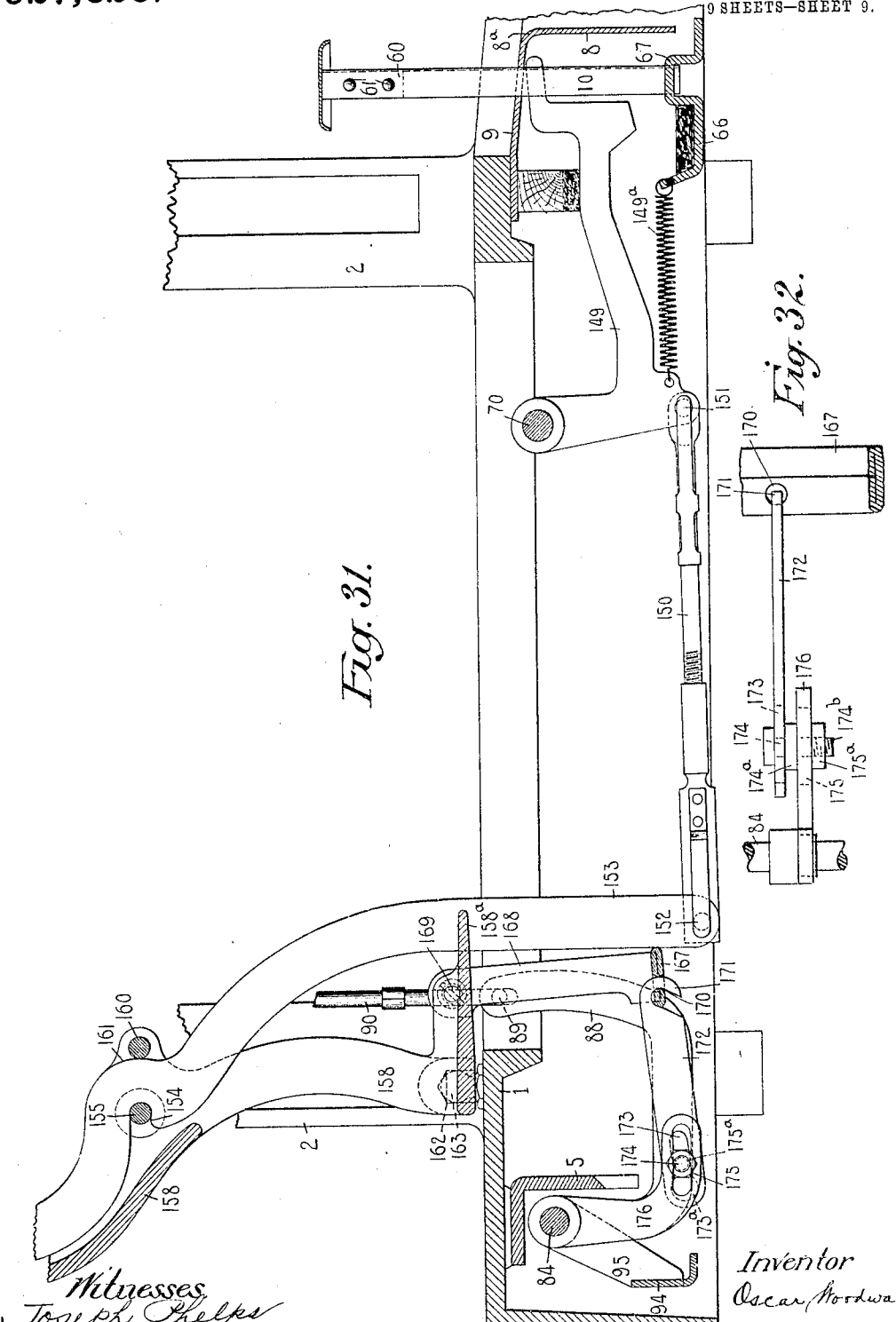

UNITED STATES PATENT OFFICE.

OSCAR WOODWARD, OF NEW YORK, N. Y., ASSIGNOR TO WYCKOFF, SEAMANS & BENEDICT, OF ILION, NEW YORK, A CORPORATION OF NEW YORK.

TYPE-WRITING MACHINE.

No. 927,626.   Specification of Letters Patent.   Patented July 13, 1909.

Application filed January 20, 1906. Serial No. 297,026.

*To all whom it may concern:*

Be it known that I, OSCAR WOODWARD, citizen of the United States, and resident of the borough of Manhattan, city of New York, in the county of New York and State of New York, have invented certain new and useful Improvements in Type-Writing Machines, of which the following is a specification.

My invention relates to tabulating mechanism for typewriting machines and one object of said invention is to provide an efficient tabulating mechanism, whereby the carriage may be moved to any desired columnar field without first arresting the carriage at a preceding columnar field.

A further object of my invention is to provide efficient denominational or decimal tabulating mechanism whereby the carriage may be arrested at any desired denominational or decimal position within the selected columnar field.

A still further object of my invention is to provide efficient carriage controlling mechanism which may be thrown into operation when the tabulating mechanism is actuated, to control the speed of the carriage during the tabulating operation.

Another object of my invention is to provide mechanism to regulate the velocity of the typewriter carriage when the same is released from its step-by-step letter spacing mechanism, and particularly to provide a positive speed controlling mechanism adjustable to a predetermined speed.

A still further object of my invention is to provide such mechanism as will offer practically no resistance to the motion of the carriage until the latter has acquired, under the pull of its driving means, a certain predetermined velocity under which it will be safe from injury if suddenly stopped in its motion by other devices on the machine, as the margin stops or the tabulator stops.

To the above and other ends which will hereinafter appear, my invention consists in the features of construction, arrangements of parts and combinations of devices to be hereinafter described and particularly pointed out in the appended claims.

Figure 1:
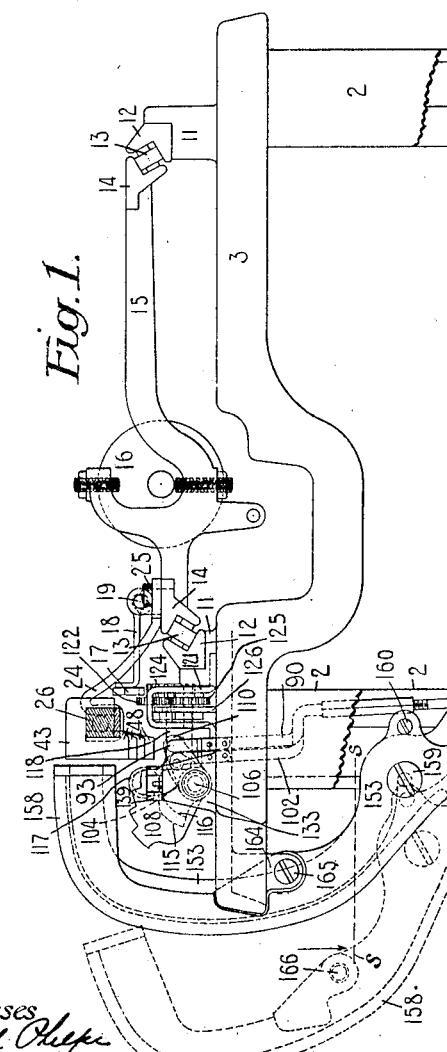
Figure 2:
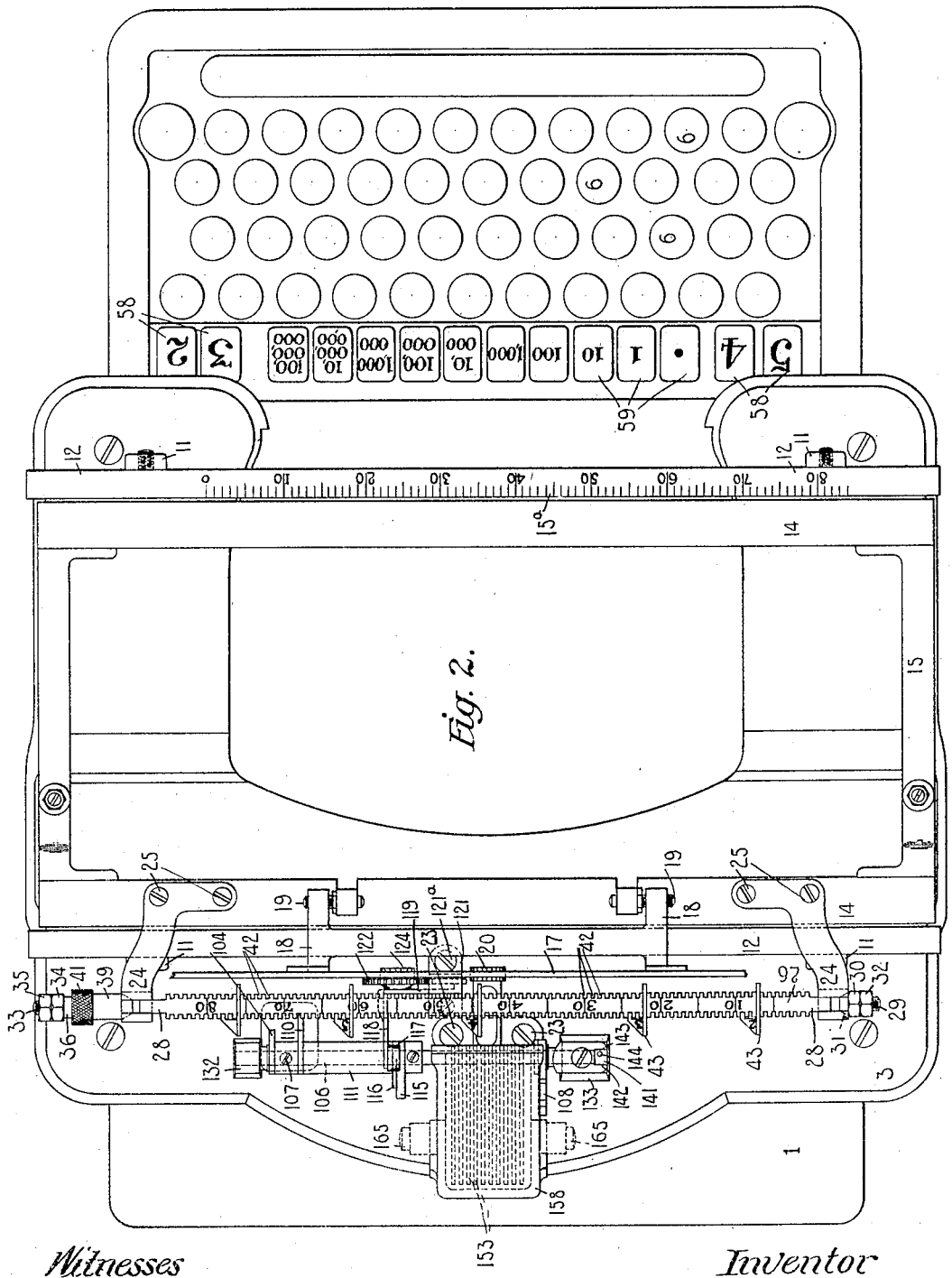

In the accompanying drawings wherein like reference characters indicate corresponding parts in the various views, Figure 1 is a side elevation, with parts broken away and in section, of a portion of one form of a typewriting machine sufficient to illustrate my invention. Fig. 2 is a plan view of the same. Fig. 3 is a horizontal sectional view of the same taken on the line *s—s* of Fig. 1 and looking in the direction of the arrow at said line; the view having parts broken away to more clearly illustrate other features of the construction. Fig. 4 is a rear elevation of the machine with parts in section. Fig. 5 is an enlarged detail top plan view of portions of the tabulating mechanism. Fig. 6 is an enlarged detail rear elevation of the same. Fig. 7 is an enlarged detail transverse sectional view of parts of the column selecting and carriage releasing mechanism. Fig. 8 is an enlarged detail vertical sectional view showing parts of the tabulating mechanism to be hereinafter more fully described. Fig. 9 is a detail side elevation with parts in section showing one of the tabulator or column selecting key levers and some of its associated column selecting mechanism. Fig. 10 is a fragmentary detail top plan view of the column selecting universal bar and portions of the means for actuating the same. Fig. 11 is a detail top plan view of the carriage release universal rock shaft. Fig. 12 is a detail vertical sectional view of one of the tabulator key caps. Fig. 13 is a plan view of one of the blanks from which a tabulator key cap is formed. Fig. 14 is an enlarged detail rear elevation with parts in section of the tabulator column stop rack bar and the means for detachably and adjustably securing the same in place. Fig. 15 is an enlarged detail fragmentary perspective view of the rack bar. Fig. 16 is a transverse sectional view taken through the rack bar and showing one of the rack bar stops mounted thereon. Fig. 17 is a detail top plan view of one of the rack bar stops. Fig. 17ª is a detail perspective view of the same. Fig. 18 is an enlarged detail transverse sectional view of the decimal stop levers and the frame in which they are pivoted, the section being taken on the line *s—s* of Fig. 1 and looking in the direction of the arrow at said line. Fig. 19 is an enlarged detail side view of the pivot for the decimal stop levers. Fig. 20 is a transverse sectional view of the rack bar and one of its bearings, the section being taken on the line *u—u* in Fig. 14 and looking in the direction of the arrow at said line. Fig. 20ª is a detail perspective view of the bearing for the tabulator rack bar on one of the supporting brackets. Fig. 21 is a transverse sectional view taken on the line v—v of Fig. 9 and looking in the direction of the arrow at said line, the view illustrating the means for forming a connection between a key stem and the tabulating key lever actuated thereby. Fig. 22 is a perspective view of one of the foot brackets which supports the key stem lower guide of the tabulating mechanism in place, and by which one of the rubber feet of the machine is secured. Fig. 23 is a fragmentary side elevation showing the connection between the keyboard carriage release lever and the sub-lever actuated thereby. Fig. 24 is an enlarged detail front elevation of the combined gear and pinion for actuating the carriage controlling device. Fig. 25 is an edge view of the same. Figs. 26 and 27 are detail front and edge views respectively of the driving pinion for the carriage controlling device. Fig. 28 is a detail face view of the vibrating lever of such device. Fig. 28$^a$ is a detail top view of the weight which is carried by the controlling device. Fig. 29 is an enlarged detail front elevation of the carriage controlling device. Fig. 30 is an enlarged detail side elevation of the same, together with its associated mechanism, the carriage feed rack and selector shaft being shown in section. Fig. 31 is a fragmentary detail side elevation showing one of the denominational or decimal stop levers, and the means for actuating the same and for effecting the release of the carriage; and Fig. 32 is a fragmentary detail plan showing the connection between the decimal stop lever release bar and the universal release rock shaft 84.

The frame of the machine comprises a base 1, corner posts 2 and a top plate 3. Key levers 4 for the printing instrumentalities (not shown) are fulcrumed on a fulcrum plate 5 which is secured to the base 1 of the machine and are provided with the usual finger keys 6. These key levers are connected to return springs 7 and may be connected in any suitable manner to the type bars. The printing key levers are guided in sawkerfs in the upright member 8 of an angular plate 8$^a$, thus forming a front comb for the printing key levers. The plate 8$^a$ also has a substantially horizontally disposed portion 9 apertured to receive the tabulator key stems 10. Thus a single plate 8$^a$ constitutes a guide for the printing key levers and also for the tabulator key stems at the front of the machine. The top plate 3 has upwardly projecting lugs 11 which support fixed grooved tracks 12 that receive anti-friction rollers 13 interposed between said tracks and tracks 14 of the carriage 15, a construction which affords a free travel of the carriage. The usual carriage scale 15$^a$ is employed to coöperate with a suitable pointer. The carriage 15 supports a cylindrical platen 16 and a feed rack 17, the latter being connected to arms 18 which are pivoted to the carriage at 19 in order that the rack may be raised and disengaged from its feed pinion 20 (Fig. 5) operatively connected to an escapement wheel 21 through the usual shaft and back clutch mechanism, such as is employed in the No. 6 Remington machine. The shaft for the escapement wheel is supported in a bearing 22 secured by screws 23 to the top plate of the machine as in said Remington machine. Rearwardly extending rigid brackets 24 (Fig. 2) are secured to the carriage by screws 25, one of the brackets being located near each end of the carriage. The rear ends of said brackets support a column stop or rack bar 26. Each of the brackets 24 has an open mouthed bearing 24$^a$, (Fig. 20$^a$) at its rear end which is substantially U-shaped in cross section, and the outer face or edge of the bearing is concaved or recessed as indicated at 27. The opening formed between the side arms of each U-shaped bearing 24$^a$ constitutes a recess in which the reduced rectangular portion 28 of the rack bar 26 may be seated, the shape of the bearing conforming substantially to the shape of the part 28. It should be understood that one of these reduced portions 28 is provided at each end of the rack bar and is received in an open bearing in each of the supporting brackets, similar to that shown in Figs. 14 and 20. The left-hand end of the rack bar is threaded at 29 for a nut 30 which has a face 31 that coöperates with a recessed portion, such as 27, in the outer edge of the left-hand bearing 24$^a$. A lock nut 32 may also be provided to secure the adjustable nut 30 in its adjusted position. It will be seen that this arrangement affords a longitudinal adjustment of the column stop rod or rack bar in its bearings, in order that it may be properly positioned to bring the stops thereon in proper lateral relation with the column selector and decimal stops. The right-hand end of the rack bar is likewise threaded as at 33 for coöperation with an adjustable nut 34 and with a locking nut 35.

A sleeve or collar 36 is mounted on the threaded end of the column stop bar and the position thereof is regulated by the nut 34. The inner end of the sleeve 36 constitutes an abutment against which one end of a coiled expansion spring 37 bears, the opposite end of said spring bearing against the bottom wall 38 of a locking device or bolt 39 and tending to force it toward the left. The locking bolt is provided with a face 40 which is received in the recess 27 in the right-hand bearing 24$^a$, thus constituting a latch, locking the rack bar in place. The locking bolt 39 has a cylindrical knurled head 41 which may be readily grasped to slide the locking bolt on the rack bar against the tension of the spring 37, and thus withdraw the face 40 from the locking recess 27 in the bearing 24$^a$, so that the rack bar may be raised, and removed from its supporting brackets 24. This construction provides means for readily removing the rack bar from the machine, so that if desired a rack bar with differently arranged column stops thereon may be substituted for the bar in use. Thus one rack bar may have the stops arranged thereon according to one printed form or blank and another rack bar may have the stops arranged in accordance with another character of blank and one rack bar may be quickly substituted for another according to the particular blank employed. The rack bar 26 is preferably grooved at letter space distances apart on the front and rear sides thereof as indicated at 42, the grooves being arranged opposite each other.

The coöperating column or rack stops 43 are preferably of the form shown in detail in Figs. 16, 17, and 17ª from which it will be seen that they are each bifurcated at 44 to provide parallel side walls 45 which are received in the recesses or grooves 42 in the rack bar. It will likewise be observed that each stop is provided with a parallel extension or engaging rib 46 which likewise takes into one of the adjacent grooves in the column stop or rack bar to afford additional support to the stop. Each stop has a flat face on one side and is off-set on the opposite side thereof to reinforce the stop and form a carrier for the engaging member or projection 46. The rearwardly projecting flat face 47 on one side of each rack stop constitutes an engaging face with which the decimal stop levers coöperate, whereas the depending end of the flat face 48 constitutes a portion with which the column selecting means engage, all as will hereinafter more clearly appear. Each of the rack stops has alined transverse recesses or openings 49 which are about coincident with the bottom face of the rack bar 26 when the stops are properly placed thereon and a locking bar 50 is received within the notches and locks the stops against removal or accidental displacement from the rack bar. The locking bar 50 extends along the rack bar and has inclined slots 51 therein and through which extend headed screws 52 which are received in threaded openings in the rack bar. The heads of the screws 52 connect the locking bar to the rack bar, and a coiled contractile spring 53 is connected at one end 54 to the locking bar and at its opposite end to a stud 55 that extends through an oblique opening 56 in the locking bar, into the stop bar. A finger piece 57 is formed from the locking bar at one end thereof, by means of which it can be pushed endwise. The spring 53 tends to maintain the locking bar in the locking position shown in Figs. 15 and 16, that is to say, with the bar seated in the recesses 49 in the column stops so that the stops are locked against removal from the bar. When, however, pressure is exerted upon the finger piece 57 to move it toward the right, a slight longitudinal movement of the locking bar will be effected and at the same time there will be a transverse movement of the bar produced by the screw and slot connection 51 and 52. This lateral or transverse movement of the bar is sufficient to remove it from engagement with the recesses or slots 49 in the rack stops, so that they are free to be removed from the bar and to be adjusted to different points along the same. In order to facilitate such adjustment the top of the stop bar may be provided with a scale which, in a general way, corresponds to the carriage scale of the machine, as indicated in Fig. 2. From an examination of Figs. 1, 6 and 7 it will be seen that the depending portions 48 of the rack stops extend downwardly different distances from the rack bar. By means of this construction, which differentiates the rack stops one from another, and coöperating mechanism, the carriage may be arrested in any desired columnar position without first arresting it at preceding columnar positions.

I will now describe the column selecting means. In the design illustrated, four of the tabulating keys which I have designated in Fig. 2 by the reference numeral 58, control the column selecting mechanism, though it should be understood that a greater or less number of such keys may be utilized, by providing the tabulator rack bar with the proper number of rack stops. Thus, if five rack stops are used, which is ordinarily sufficient, four column selecting keys 58 will be necessary, as will hereinafter more clearly appear. The keys are provided with indices such as the numerals "2", "3", "4", and "5" and the rack stops 43 may likewise be provided with corresponding indices, so that they can easily be placed on the rack bar in their proper order. The columnating keys are preferably arranged two on each side of the set of denominational or decimal keys 59 and at opposite sides of the keyboard of the machine, though they may be otherwise arranged. Each key stem 10 of the tabulating keys, whether they be denominational keys 59 or column selecting keys 58, is made in the same manner, preferably by folding a sheet metal strip into substantially U-shape in cross section so that the loop-like portion or edge of the stem is presented toward the front of the machine. Each key head or cap is formed from a blank such as is shown in Fig. 13, with the portions 60 thereof projecting from opposite sides of the head. The blank is afterward struck up in the form shown in Fig. 12, so as to bring the portions 60 together to form a shank which is received within the upper end of the key stem and riveted in position by rivets 61 passing through the key stem and the shank on the key cap, thus firmly uniting the cap to the key stem. An aperture 62 is formed in the round edge of the key stem 10 by punching a strip 63 therefrom. This strip is bent inward to a form to afford a smooth bearing for the tabulator key lever end 65, which passes between the side walls of the stem and through the opening 62 therein. As heretofore described each key stem passes through an opening in the portion 9 of the angular plate 8ᵃ and the lower end of each stem likewise passes through an opening in a lower guide plate 66, preferably formed by bending up the plate at 67 in the manner shown in Fig. 9 and sawing across the upper bent portion of the plate, so as to form a series of sawkerfs or openings that extend through the plate and form guides for the tabulator key stems 10. The plate 66 is likewise bent or formed with a trough-like portion 68ᵃ to receive a pad 68 against which the projection 69 on the angular tabulator key levers 64 strike when the tabulator keys are depressed to their lowermost position. The various angular tabulator key levers 64 are assembled on a pivot shaft 70 (Fig. 3), which extends across the machine from side to side and is seated in openings in its base. Collars 71 are secured to the rod by set screws 71ˣ and abut against the inside of the base to prevent an endwise shifting movement of the rod. It will be observed that sleeves or hubs 72 separate each pair of tabulator key levers to maintain them properly spaced apart. Each spacing sleeve may be in the nature of a hub connected to its associated angular lever 64, and sleeves 72ᵃ secured to the rod 70 by screws 72ᵇ prevent the hubs 72 from moving longitudinally on the pivot rod.

Each tabulator key lever 64 has one end of a contractile restoring spring 73 connected thereto at 74, (Fig. 9), the opposite end of said spring being connected to the rear flange 66ᵃ of the lower key stem guide 66, as indicated at 75. Each tabular key lever is likewise apertured for the reception of the pivot pin 76 forming part of the ordinary spring clip 78 of the push rod 77. Each push rod 77 is preferably a two-part rod joined by a screw threaded connection 80 to permit a lengthening or shortening of the rod. The rear end of each push rod 77 has a key hole slot 81 in the flattened portion thereof for coöperation with the stem 82 of a headed stud which projects laterally from a crank arm 83 secured to a rock shaft 84. The enlarged opening 85 at the rear end of the slot 81 enables the head 82ᵃ of the stud to pass through the opening, thus permitting an assemblage of the parts. When the pin is in the narrow portion of the slot 81 the head prevents a disconnection of the push rod from the pin. The rock shaft 84 is mounted upon pivot screws 86 (Fig. 4) with cone bearings, which screws extend through threaded openings in the base 1 of the machine. Locking nuts 87 are provided to secure the pivot screws against accidental displacement. In the normal position of the parts the forward ends of all the slots 81 in the different push rods bear against the pins 82. On reference to Figs. 1 and 9 it will be seen that the rock shaft 84 has a forwardly and upwardly projecting arm 88 secured thereto. The upper free end of this arm is apertured to receive the laterally projecting pin 89 of an ordinary pivot clip 91 forming part of an upright pull rod 90. The upper end of the pull rod 90 is pivotally connected at 93 to carriage releasing mechanism which will be hereinafter more clearly described.

Each of the push rods 77 is adapted to contact at its rear end with what I term a differential or selector universal bar 94 which, as shown in Figs. 9 and 10, is formed of a single piece of sheet metal, provided at its ends with upwardly extending integral arms 95 that are pivoted on the rock shaft 84 and with a stiffening flange 94ᵇ at its lower edge. Returning springs 94ᵃ (Fig. 3) are connected to said bar at opposite ends thereof and to a stud 94ᶜ extending from the base of the machine. From an inspection of Fig. 10 it will be seen that the ends of the four push rods 77 are normally located at different distances from the coöperating bearing faces 96, 97, 98 and 99 on the forwardly extending flange 94ᵇ of the selector universal bar. Thus the push rod 77 at the right hand side of the machine, which is connected to the key bearing the numeral "2" and which effects an operation of the column selecting means to coöperate with the first stop 43 to select the second column on the paper, is in contact with the bar in the normal position of the parts, whereas the second push rod from the right, which is controlled by the column key bearing the numeral "3" is a short distance from the coöperating contact face of the selecting bar in the normal position of the parts, the two remaining rods 77, counting from right to left, being at gradually increasing distances from their coöperating contact faces. In this manner the selecting bar will be taken up sooner or later by the different push rods and a greater or less extent of movement will be transmitted thereto, depending on which of the four column selecting keys is actuated. The movement thus transmitted to the selecting bar produces a downward movement of an arm 100 secured at 101 thereto. This arm 100 is shaped like the arm 88 and extends forwardly and upwardly to an upright link or pull rod 102, the upper end of which is pivoted at 103 to a crank arm 104 (see Figs. 5 and 7). The crank arm 104 is rigidly connected to or formed integral with a sleeve 105 which is secured to the rock shaft 106 by a set screw 107. The rock shaft near the left-hand end thereof has a stepped stop 108 secured thereto, the edge of the stop having steps or stops 109 thereon, whereas the working face or side of the stop piece is in a single plane extending fore and aft of the machine.

It will be understood that the extent of movement transmitted to the selecting bar 94 will determine the extent of rocking movement transmitted to the shaft 106, and that this in turn will move the multiple stop 108 to different extents fore and aft of the machine around the axis of the shaft to bring different portions 109 of the stop into coöperation with the depending portions 48 on the different column or rack stops and that the rotary stop 108 will only coöperate with the column stop with which it is intended to coöperate, as determined by the particular column selecting key which is depressed. Thus if the key bearing the index numeral "2", indicating the 2nd column, be depressed, then the rotary column selecting stop will be rotated the greatest distance to bring the rearmost portion or step 109 thereof into coöperation with the first column stop 43, counting from left to right when looking from the front of the machine in Fig. 2, and writing may take place in the second columnar field located between the first and second column stops; whereas if the column selecting key bearing the index numeral "5" be depressed, the selecting bar will not be moved so far and the first stop or step 109 on the rotary stop 108 will be moved to a position where it will coöperate with the fourth column stop 43 of the series, counting from left to right in Fig. 2, and writing may take place in the fifth columnar field to the right of the fourth column stop. It follows therefore that the extent of movement transmitted to the rotary column selecting stop 108 determines the position of columnar arrest of the carriage or the columnar field at which said carriage shall be arrested and that the carriage will not be arrested by the preceding stops. If the carriage be in the extreme right hand position and it is desired to select a denominational position, it is merely necessary to depress the appropriate denominational key 59 and it will coöperate with the first columnar stop, arresting the carriage in the desired denominational position in the first columnar field, or in that space which is to the left of the first column stop in Fig. 2, when looking from the front of the machine or in the column on the paper which is at the left-hand side thereof. For this reason it is unnecessary to provide a number "1" column key or a special key for the first column.

While I have referred herein to the stops 43 as column stops it will be understood that said stops have a two-fold function; that is to say, the same stops locate and determine the columnar fields by coöperating with the column selecting stop 108 to bring about the arrest of the carriage at the proper columnar field and they also coöperate with the denominational stops 153 to effect an arrest of the carriage at the proper denominational position within the selected field. The construction and arrangement of the parts is such that a columnar field may be selected, say for instance, the second columnar field which is between the first and second column stops, and then the name "John Doe" may be written within the first part of the field and this may be followed by the numerals "7,268.25" for instance, which may be properly located within this same field by the denominational stop mechanism as in the following example:—

John Doe    7,268.25      John Roe    86,405.10
James Smith 1,181.        Frank Brown 1,451.
Frank White 1,254.10      Geo. Black  5,126.05

Thus from an inspection of Fig. 6 it will be observed that the column determining stop 108 is situated to the left of the series of denominational stops 153, looking from the front of the machine, and that each column or rack stop 43 passes to the left of the entire series of denominational stops before it coöperates with the column selecting stop. It follows therefore that after any given column stop, say, for example, the first, and the column selecting stop are brought into coöperation, the name "John Doe" may be written in the first part of the second column and that a subsequent operation of the thousands denominational key will project the corresponding denominational stop 153 into the path of the next succeeding or second column stop and that the numerals "7,268.25" may then be written within the same columnar field and not in the next columnar field as was usually the case heretofore. It will also be seen that the column determining stop 108 is situated about four letter space distances from the decimal or left hand denominational stop. This arrangement provides proper space between columns and assures at least two letter space distances between the last written character in one column and the first written character in the next succeeding column, as for example, when characters are written in the tenths position at the last part of a columnar field, thus "7,268.25", and this is immediately followed at the first part of the next columnar field with writing as shown in the foregoing example.

The relative arrangement of the indices on the rack bar 26 and the denominational and column selecting stops is such that a rack stop set on the bar in accordance with any particular index numeral will effect the arrest of the carriage at a corresponding numeral on the carriage scale when the run of the carriage is effected by a column determining key. If, for instance, a rack stop 43 be set at the index numeral "45" on the stop bar and the requisite column selecting key be depressed, then the carriage will be arrested at "45" on the carriage scale by the stop 108. If, however, the denominational keys be successively operated to coöperate with the different column or rack stops and without actuating the selecting stop 108, then the carriage will not be arrested according to the indices on the stop rod but will be arrested four letter space distances earlier than it would if a column selecting key is employed to secure the position. For example, if a stop 43 is set on the rack bar at the index numeral "45" on the stop rod and the left-hand denominational stop 153 is successively actuated until said stop 43 is brought into coöperation therewith, then the carriage will not be arrested at "45" on the carriage scale but at "41". This is due to setting of the column determining stop 108 four letter space distances to the left of the left-hand denominational stop as has been described. It is desirable therefore for the operator to secure the columnar position wholly by an actuation of the column selecting means when the column selecting and denominational means are both used in the same machine and to utilize the denominational stops wholly for securing the denominational position within a selected columnar field. When, however, the denominational mechanism alone is employed, then the indices on the stop rod 26 should correspond in arrangement to the carriage scale 15ª, so that when a column stop is set at, say, "46" on the stop rod and the left-hand denominational stop is actuated, then the carriage will be arrested at "46" on the carriage scale. It should also be observed that the first columnar field is located between the beginning of the line on the paper and the position determined by the first column stop; or in other words, in the space on the paper to the left of the position defined by the first column stop, so that writing may take place at the first part of a line and this may be followed in the same columnar field by numerals, the positions of which are determined by the denominational tabulating mechanism, whereas ordinarily it is necessary in other machines to write the numerals in the second columnar field or in the space between the first and second column stops. While the column selecting mechanism is being actuated in the manner hereinbefore described, the release of the carriage and the connection of the carriage to the carriage-speed controlling means is being effected. Thus the upper end of the pull rod 90 is pivoted at 93, Figs. 5 and 7, to a crank arm 110 which is connected to or forms part of a sleeve 111 that is mounted to turn on a rock shaft 106. The sleeve 111 has formed as a part thereof, or connected therewith, a carriage releasing device and the sleeve and carriage releasing device are prevented from moving longitudinally on the shaft by the collar 105, hereinbefore described, and by a collar 113 which is secured to the shaft by a screw 114. This carriage releasing device comprises a cam 115 secured to or formed as a part of the sleeve 111 and to the left-hand side of the cam in Fig. 5 is formed a shoulder 116 which is concentric with the axis of the shaft 106 for purposes which will hereinafter appear. An anti-friction roller 117 projects laterally from a releasing lever 118 to which it is pivoted, and the roller bears against the cam 115, and under certain conditions against the concentric face 116 on the releasing device. From an inspection of Figs. 29 and 30, it will be seen that the lever 118 has a substantially right angular bent portion 119 at the rear end thereof, and the terminal of the portion 119 is pivoted by a screw 120 to one arm of a U-shaped bracket 121 secured to the top plate 3 of the machine by screws 121ª. The portion 119 of the releasing lever or arm has a gear 122 pivoted at 123 to rotate thereon. The gear 122 has a pinion 124 connected to or formed integral therewith, and this gear meshes with a driving pinion 125 pivoted to the bracket 121 by a screw pivot 125ª.

It will be seen that the swinging movement of the release lever or arm 118—119 is around the pivot screw 120 as a center, and that this pivotal center is coincident with the pivotal center of the driving pinion 125. It will also be seen that in the bodily movement of the gear 122 with the releasing lever 118—119, the pivotal axis of the gear will describe an arc, the center of which is coincident with the pivotal center of the driving pinion 125, so that no matter what the position of the releasing lever 118—119, the gear 122 will always remain in mesh with the pinion 125.

A lever or vibratory device 126 is pivoted to the bracket 121 by a screw pivot 127 and is adapted to oscillate like the pendulum of a clock. This lever or vibratory device has an elongated slot 128 extending longitudinally thereof and a laterally projecting pin 129 on the pinion takes into this slot and as the pinion rotates, a vibratory motion will be transmitted to the lever 126. A weight 130 is slotted at 130ª (Fig. 28ª) and the heads 130ᵇ of rivets 130ᶜ overlap the slot 130ª and prevent a lateral withdrawal of the weight from the lever 126 but afford a longitudinal or sliding movement of the weight on the lever. Beneath the weight and surrounding the lever 126 is a coiled expansion spring 131 which is supported at its lower end by a nut 131ª carried by and adjustable on the lever 126 and held against accidental displacement by a check nut 131ᵇ. The purpose of this arrangement is to afford an adjustment of the weight toward and from the pivotal center of the lever, so as to provide more or less resistance to the movement of the lever by the pinion 125 and also to afford an automatic movement of the weight on the lever away from and toward the pivotal center of said lever.

In the normal positions of the parts the carriage feed rack 17 is in the full line position shown in Fig. 30 where it is just above and out of contact with the pinion 124. At this time there is no connection whatever between the feed rack and the device for controlling the speed of the carriage which comprises the gears 122, 124, 125 and the weighted lever 126. When, however, the column selecting key is actuated, motion is transmitted through the associated angular lever 64, push rod 77, rock shaft 84, crank arm 88 and pull rod 90 to the cam 115 which, when turned from the full line to the dotted line position in Fig. 30, turns the lever 118—119 on its pivot 120. The effect of this movement is to elevate the gear 122 and the integral pinion 124 to the dotted line position shown in Fig. 30, thus bringing the pinion 124 into mesh with the teeth on the feed rack and elevating the rack to the dotted line position where it is disengaged from the carriage feed pinion 20. This movement disengaging the feed rack from its pinion also throws the carriage controlling device into coöperation with the carriage so that when it is released from the feed pinion and starts to move, under the power of the spring drum (not shown) motion will be transmitted by the feed rack to the pinion 124 and through the pinion to its integral gear 122, and from the gear 122 to the pinion 125, and the rotation of the pinion 125 will cause the lever 126 to be vibrated, thus offering a resistance to the movement of the carriage and enabling it to move under control of the vibrating lever at the desired rate of speed, which may be determined by an adjustment of the weight 130. The speed of vibration of the pendulum or vibratory device will be increased directly in proportion to the velocity of the spring-driven carriage and while practically no resistance is offered to the pendulum or vibratory device until its speed of vibration has reached a certain point, due to its effective length, the resistance offered by the pendulum will increase rapidly after its speed has reached and passed the natural speed of vibration due to its length. The effective length of its pendulum will be increased automatically by reason of the centrifugal force throwing the weight against the spring and away from the center of vibration of the pendulum, causing its natural rate of vibration to be lessened. When the resistance, including that offered by the vibrating pendulum, equals the pull of the spring (not shown) on the carriage, the latter will maintain a uniform velocity until arrested. It will be understood that this equalizing of the resistance to the pull may be readily effected by varying the position of the weight 130 on the vibrating arm and that this may be accomplished either by lengthening or stiffening the spring 131 or by moving the same toward or away from the pivotal center of the lever by means of the set nut 131ª, so that within the capacity of the machine, any determined speed may be obtained.

When a column selecting key has been depressed and the stop 108 has been moved to the desired position and the carriage is released in the manner hereinbefore described, it is desirable to automatically throw the carriage speed controlling device out of operation and to automatically restore the carriage to the control of its step-by-step feed mechanism when the carriage has completed its run and the column selecting and coöperating column stop has been brought into contact; and for this purpose I provide means that are automatically actuated and controlled by the run of the carriage. Thus the shaft 106 is mounted in its bearings to move longitudinally for a limited distance, as well as to rotate. The bearing 132 at the right-hand end of the shaft, looking from the front of the machine, is apertured to afford a longitudinal as well as a turning movement of the shaft 106. The left-hand bearing 133 is constructed as shown in detail in Fig. 8 of the drawings with a thimble 134 which is seated in an opening in the bearing or lug 133 and is adapted to receive a cylindrical enlargement 135 on the shaft 106. A coiled expansion spring 136 bears at one end against the bottom 137 of the thimble and at its opposite end against a shoulder 138 formed by the cylindrical enlargement 135 on the shaft. The tension of the spring 136 is therefore exerted to maintain the shaft 106 at the limit of its longitudinal movement toward the right. A stop 139 is adapted to turn on a headed screw pivot 140, the threaded end of which is received in an opening in the bearing or lug 133, so that the stop has a pivotal movement around the screw as a pivot. The stop is bifurcated, as indicated at 141, so as to provide stop members 142, 143 which coöperate with a fixed pin 144 carried by the bearing stud 133 and projecting into the bifurcated portion of the stop 139 to limit the turning movement of said stop. The stop 139 has a curved contact face 145 which is eccentric to the pivotal center of the stop and extends into the path of movement of the stop 108 as it moves bodily with the shaft 106 from right to left. It will be seen that the construction is such that when the rock shaft 106 receives a longitudinal movement from right to left, it will cause a corresponding movement of the cam 115, and that the anti-friction roller 117, which bears on the cam, will drop from the face of the cam to the concentric portion 116 thereof. The effect of this dropping movement of the anti-friction roller on the cam is to lower the release lever 118—119 to its normal position, thereby restoring the gear 122 to its lowermost position, thus enabling the feed rack 17 to engage its feed pinion 20 and automatically disconnect the rack from the speed controlling device. This operation is effected when a column-stop carried by the carriage contacts with the column selecting stop 108 and the impact of the carriage moves the shaft 106 from right to left until the column selecting stop 108 is forced into contact with the stop 139. This movement, as heretofore pointed out, effects an automatic disengagement of the carriage controlling mechanism and restores the carriage to the control of the feed pinion 20 and to the ordinary step-by-step carriage feed mechanism. When pressure is released upon the column selecting key, the rotation of the column selecting stop 108 to the normal position will take place, and during this movement of the stop 108 the stop 139 will turn on its pivot 140 and the limit of such turning movement of the stop 139 is determined by the stops 142 and 144. The purpose of this movement of the stop 139 is to prevent the pressure of the carriage upon the parts from overcoming a restorative movement of the stop 108 and its associated parts to the normal position. Thus by pivoting the stop 139 in the manner described, and providing an eccentric face 145 thereon, an easy movement of the stop 108 to its normal position is afforded; the lowest portion of the eccentric face being gradually brought into coöperation with the stop 108 as stop 139 turns upon its pivot and when the feed rack has become reëngaged all pressure of the carriage will be taken up by the feed rack and feed pinion and pressure between the engaged column stop and the stop 108 will be relieved or wholly released by the slight lateral movement of the stop 108 through turning movement of the eccentric faced stop 139. When the stop 108 has been restored to its normal position and pressure is released upon the stop 139, it is restored to its normal position shown in Fig. 5, by a coiled spring 146 that surrounds the pivot and is secured at one end 147 to the stop and at its opposite end 148 to the bearing 133.

I will now proceed to describe the denominational tabulating mechanism, which may be used to determine the proper denominational position of arrest of the carriage within the selected columnar field. From an inspection of Fig. 2 it will be seen that the denominational keys 59 bear indices designating the decimal, units, tens, hundreds, thousands, tens of thousands, hundreds of thousands, millions, tens of millions, and hundreds of millions positions of arrest. Each key 59 and its key stem 10 is constructed in the manner heretofore described and is connected to an angular lever 149 similar to the angular levers 64 and like said levers each lever 149 is pivoted on the pivot rod 70 and is connected to a two-part push rod 150 by a pivotal connection 151. The rear end of each push rod is pivoted at 152 to the lower end of a denominational stop lever 153. The means for connecting each of the two-part push rods 150 to its angular lever and its denominational stop lever is the same as the connections heretofore described between the angular levers 64 and the push rods 77, and restoring springs 149$^a$ are employed to restore the angular levers 149 and the associated parts to their normal positions. The restoring springs 149$^a$ are constructed and connected like the springs 73 hereinbefore described. Each denominational stop lever 153 extends upwardly and forwardly at its upper end where it forms a stop which coöperates with the column stops 43. Each of the levers 153 has a notch 154 in the rear edge thereof for coöperation with a pivot 155 (see Fig. 31). The pivot 155 is shown in detail in Fig. 19, from which it will be seen that washer-like projections 156 are formed on the pivot to constitute spacing means for the different denominational stop levers and to maintain them properly spaced apart at the pivotal portions thereof. The pivot 155 is provided with a threaded end 157 which takes into a threaded opening in the frame 158 (Figs. 4 and 18), for the stop levers, the other or headed end 159 of the pivot being seated in an alined opening at the other side of the frame 158. A rod 160 extends from side to side of the frame 158 forward of the levers 153 and at about the level of the pivot 155, as indicated in Fig. 31, to prevent an accidental displacement of the levers from their pivots. The rod 160 has a threaded end 160$^a$ (see Fig. 18) which is received in a tapped opening in one side of the frame 158, the opposite end or head of the rod being seated in a bearing in the opposite side of the frame 158. It will be seen that the various stop levers 153 are rounded at 161 so as to afford a movement of the levers on their pivot and yet coöperate with the stop pin 160 at any point in the movement of the levers to prevent a displacement of the levers from their pivot. Various of the levers 153 are bent laterally as shown in Fig. 4, so as to compensate for the difference in width between the system of actuating means therefor at the lower ends of the levers and the stop carrying portions at the upper ends of the levers. The frame 158 extends outwardly at the lower portion thereof to conform to the system of levers 153 and a bearing opening or socket 162 is formed in the bottom edge of the frame 158 at each side thereof for coöperation with a stud 163 carried by the base of the machine and which has a spherical bearing head for coöperation with the socket. This hinged joint constitutes a bearing for the frame 158 at the lower end thereof and on which the frame is adapted to turn toward and from the machine, whereas, the upper end of the frame is secured to depending lugs 164 which project from the top plate and are situated on opposite sides of the frame 158. Screws 165 extend through the lugs and are received in openings 166 in the frame 158, so as to secure the frame in place. The top plate of the machine is cut away at the rear edge thereof to receive the frame 158 and the denominational stop levers and to afford a free fore and aft movement of the latter. The outline of the opening is shown in Fig. 5 from which it will be seen that the frame 158 fits snugly within the opening in the top plate and that the screws 165 firmly secure the frame in place and that the top plate itself prevents a lateral displacement of the frame. By these means I provide a structure in which the frame 158 as a whole, together with the denominational stop levers, may be moved from the full line to the dotted line position to give access to the escapement mechanism and other parts of the machine by merely removing the screws 165. When the frame 158 and the stop levers are turned back to the dotted line position, they turn on the bearings 162 and 163.

The frame 158 has a forwardly extending shelf-like projection 158$^a$ (see Figs. 1, 3 and 31) which is slotted in its forward edge to form a comb-plate for coöperation with the stop levers which are received in the slits and are properly spaced and guided by the comb-plate thus formed. The construction of the stop levers and the frame 158 and the manner of mounting the same in the machine, afford a ready assemblage of the parts and they may be quickly removed when desired for the purpose of repair.

As heretofore pointed out, the upper forwardly extending ends of the stop levers 153 coöperate with the rear sides of the column stops 43 when the stop levers are actuated by their keys 59. A universal or decimal stop release bar 167 (Figs. 31 and 32) extends across the system of levers 153 at the lower ends thereof so that a rearward movement of any of the stop levers causes a corresponding movement of the universal bar. This bar is doubled on itself at the central engaging portion thereof and has upwardly extending side arms 168 of a single thickness of metal which are pivoted at 169 to the forward extension 158$^a$ of the frame 158 so that the universal bar is adapted to vibrate around the pivots 169. The bar 167 is apertured at 170 for coöperation with a hook 171 on a link 172, the rear end of which is slotted at 173 for coöperation with a headed pin 174 which has an integral octagonal portion 174$^a$ for coöperation with a wrench on the side of the link opposite the head and a threaded extension 174$^b$ passes through a slot 175 in a crank arm 176 rigidly connected to the rock shaft 84. A nut 175$^a$ secures the pin 174—174$^a$—174$^b$ in any desired position to which it may be adjusted along the slot 175 to regulate the timing of the take up of the crank arm 176 by the link 172. The slot 173 has an enlarged terminal portion 173$^a$ through which the head of the pin 174 is received. The slot 173 affords a movement of the rock shaft 84 and arm 176, when actuated through the selecting bar 94, in the manner hereinbefore described, by any of the column selecting keys without affecting the bar 167. When, however, a denominational key is depressed, a rearward movement is transmitted to the associated push rod 150 by the angular lever 149, thus producing a rearward movement of the lower end of the associated stop lever 153. This movement is effective to move the release bar 167 toward the rear of the machine and to move the link 172 to turn the rock shaft 84. The pin and slot connections between the push rods 77 and the crank arms 83 enable the shaft 84 to be thus turned without affecting the selecting bar or the push bars which actuate it. The turning movement of the rock shaft 84 effects an operation of the carriage releasing mechanism in the manner hereinbefore described and at the same time that the carriage is released, the carriage speed controlling device is automatically thrown into operation. When the carriage is released by an actuation of a denominational key and is arrested by the projection of the associated denominational stop into the path of one of the column stops, the force of the impact between the stops is borne by the engaged column stop, by the stop bar 26, by the projected denominational stop and by the frame 158 which supports the same, and in this event no automatic reëngagement of the releasing device by impact between the stops is effected, the parts merely resuming their normal positions when pressure on the denominational key is released.

In addition to effecting a release of the carriage through an operation of either the column selecting or denominational keys, I provide an additional key 177 at the keyboard of the machine for releasing the carriage without interposing the tabulator stops. The key 177 is connected to a key lever 178 which is similar in form to the printing key levers 4 and like said levers 4 it is fulcrumed on the fulcrum plate 5. The key lever 178 is preferably situated at the left-hand side of the machine as illustrated in Fig. 3 and has a rearwardly extending finger 179 (see Fig. 23)

formed thereon, the construction being such that an elongated slot 180 is formed between the finger 179 and the body of the key lever. This slot 180 receives a pin 181 which projects laterally from an angular lever 182 that is like the angular levers 64 and 149, except that the forwardly projecting finger on each of said levers which coöperate with the associated key stem is omitted from the lever 182. The angular lever 182 is adapted to turn on the pivot rod 70 and is pivotally connected at 183 to a rearwardly extending two-part push rod 184 which corresponds to the push rod 77 heretofore described, and like said rods has an elongated opening 185 in the rear flattened end portion thereof for the reception of a laterally projecting headed pin 186 which projects from a crank arm 187 secured to the rock shaft 84. From an inspection of Fig. 10 it will be observed that the forwardly extending edge 94$^b$ of the angular selecting bar 94 is entirely cut away opposite the rear end of the push rod 184, so that the full rearward movement of the push rod may take place without it contacting with the selecting bar. It will follow from this construction that on a depression of the release key 177 a downward motion will be transmitted to the forward end of the angular lever 182 by reason of the pin and slot connection 180—181 between the key lever and angular sub-lever and that this movement of the sub-lever effects a rearward movement of the push rod 184 which vibrates the crank arm 187, thus turning the rock shaft 84 which is effective to produce a downward pull of the rod 90, thus releasing the carriage in the manner hereinbefore described through the cam 115 and at the same time automatically connecting the carriage speed controlling device with the carriage. When pressure on the key 177 is released the parts will be restored to their normal positions and the carriage will be reëngaged with its step-by-step letter feed mechanism. A restoring spring 188, which is like the springs 73 and 149$^a$, is connected to the part 66 and to the angular lever 182 to restore said lever and its associated parts to the normal positions.

Foot brackets 189 (Fig. 22) are each secured by screws 190 (Fig. 1) to a side of the base at the forward part of the machine. Each bracket has inwardly projecting ears 191 to which the plate 66 is secured by screws 192 and a curved or semi-cylindrical threaded inwardly curved portion 193 is formed on each bracket and a corresponding oppositely disposed semi-cylindrical unthreaded depression is formed in the base of the frame, so that the base and each bracket together have an opening which is threaded on one side and in which a rubber foot 194 is seated.

Each of the crank arms 83, 88, 176 and 187 (Fig. 11) which are connected to the shaft 84 are preferably rigidly mounted on the reduced end 195 of a hub-like sleeve 196 which in turn is fastened to the shaft by a pin 197 which extends through the sleeve and into the shaft.

In the operation of the device, a key 58 is first depressed to move the stop 108 to select the desired column. This same depression of a key 58 is effective to release the carriage and at the same time automatically throw the carriage controlling device into operation to control the speed of the carriage and prevent undue shock when the predetermined column stop impacts with the column selecting stop 108. When the two stops are in contact the pressure exerted by the usual carriage spring (not shown) or the impact between the stops will overcome the pressure exerted by the spring 136 and the rock shaft 106 with the stop 108 thereon will be moved to the left until the stop 108 contacts with the pivoted stop 139. This longitudinal movement of the shaft 106 to the left likewise moves the cam 115 to the left and away from the roller 117 which drops on the concentric portion 116 on the cam, thus allowing the feed rack to drop back into engagement with the feed pinion 20 and automatically disconnecting the carriage controlling devices from the carriage. This automatic restoration of the carriage to the control of its feed mechanism is effected instantly when two stops 43 and 108 are brought into contact and is effected by the run of the carriage itself. When pressure on the depressed key 58 is released the restoring springs 73 and 94$^a$ cause the various parts of the column jumping or column selecting mechanism to be restored to their normal positions. During the rotary return movement of the stop 108 to normal position it will have a rolling contact on the arresting stop 139 and the stop 139 will turn with it, and as the lower portion of the eccentric face thereon is reached it will afford a further slight movement of the stop 108 to the left, thus releasing all pressure between the engaged stop 43 and the stop 108, the carriage being held at this time by its feed pinion and it cannot follow the stop 108. As pressure is released between the stops 43 and 108, the stops 108 and 139 will fly back to their normal positions. These means enable the stop 108 to be easily restored and prevent the pressure on the carriage from holding the stop 108 in its projected position. The proper denominational key is next depressed and the associated stop will be projected forwardly to the right of the stop 43 which was engaged by the stop 108 and the carriage is at the same time automatically released so that the carriage will be arrested at the proper denominational position in the selected columnar field. When pressure on the denominational key is released the feed rack will again engage the feed pinion and the operator may proceed to write by operating the character keys.

It should be understood that the parts are so timed that the proper step 109 on the column arresting stop 108, whether it be the first or the last step 109, is interposed in the path of the coöperating column stop before or at the time the carriage is released. In other words, the differential throw given to the stop 108 through the selecting bar and its connections is such that the requisite step 109 will be interposed in the path of its column stop by the time the cam 115 has been turned far enough to release the rack.

From certain aspects of my invention the stops 43, 108 and 153 may be regarded generally as tabulator stops, and from certain other aspects of the invention the stops 43 may be regarded as column stops, or stops that have the two-fold function of coöperating with the column selecting and denominational mechanism, whereas the stop 108 may be regarded as a column determining or column selecting stop and the stops 153, or the stop engaging portions of the levers 153, may be regarded as denominational or decimal stops.

While I have shown one embodiment of my invention, it should be understood that various changes may be made without departing from the invention, and some of the features may be employed without others.

The construction of the key stems and the means whereby the key stems are connected with the angular levers are not claimed herein but are claimed in a separate application filed by me Sept. 18th, 1908, Serial No. 453,575.

What I claim as new and desire to secure by Letters Patent is:—

1. In a typewriting machine and tabulating mechanism, the combination of a carriage, tabulator stops therefor, key stems, independent angular levers actuated by said key stems, rods actuated by said angular levers, and connections between certain of said tabulating stops and said rods, said connections comprising a selecting bar that is moved different distances by the different tabulator keys.

2. In a typewriting machine and tabulating mechanism, the combination of a carriage, tabulator stops therefor, key stems, independent angular levers actuated by said key stems, rods actuated by said angular levers, connections between certain of said tabulating stops and said rods, said connections comprising a selecting bar that is moved different distances by the different tabulator keys, and carriage releasing means comprising a rock shaft that is operatively connected to said rods, a carriage releasing device, and connections from the carriage releasing device to said rock shaft.

3. In a typewriting machine and tabulating mechanism, the combination of a carriage, column stops, a column selecting stop that is normally operable and is adapted to be moved different distances to coöperate with the different column stops, a selecting bar that controls the movement of said column selecting stop, carriage releasing mechanism, and a series of key actuated devices that are connected to the carriage releasing mechanism by pin and slot connections and coöperate with the selecting bar to move it different distances, whereby an actuation of one of said key actuated devices is effective to release the carriage and arrest it in a position to print within the desired columnar field as determined by the particular key actuated device which is operated.

4. In a typewriting machine and tabulating mechanism, the combination of a carriage, column stops, a column selecting stop that is normally operable and is adapted to be moved different distances to coöperate with the different column stops, a selecting bar that controls the movement of said column selecting stop, carriage releasing mechanism including a release rock-shaft, and a series of key actuated devices that are connected to the rock shaft by pin and slot connections and coöperate with the selecting bar to move it different distances, whereby an actuation of one of said key actuated devices is effective to release the carriage and arrest it in a position to print within the desired columnar field as determined by the particular key actuated device which is operated.

5. In a typewriting machine and tabulating mechanism, the combination of a carriage, column stops, a column selecting stop that is adapted to be moved different distances to coöperate with the different column stops, a selecting bar that controls the movement of said column selecting stop, carriage releasing mechanism, a series of key actuated devices that are connected to the carriage releasing mechanism by pin and slot connection and coöperate with the selecting bar to move it different distances, a series of denominational stops that coöperate with the column stops, a separate series of key actuated devices for operating said denominational stops, and a release bar operatively connected to said carriage releasing mechanism and which is actuated by said last mentioned separate key actuated devices.

6. In a typewriting machine and tabulating mechanism, the combination of a carriage, tabulating stop devices, and means normally operable for bringing said stop devices into coöperative relation, said means comprising finger keys, angle levers operated by said finger keys, push rods that are moved longitudinally by said angle levers, and differential mechanism between said push rods and stop devices.

7. In a typewriting machine and tabulating mechanism, the combination of a carriage, tabulating stop devices, and means normally operable for bringing said stop devices into coöperative relation, said means comprising finger keys, angle levers operated by said finger keys, push rods that are moved longitudinally by said angle levers, a selecting or differential bar that is moved different extents by said push rods, and means for connecting said differential bar and certain of said stop devices.

8. In a typewriting machine and tabulating mechanism, the combination of a carriage, normally operable tabulating stop devices, and means for bringing said stop devices into coöperative relation, said means comprising finger keys, angle levers operated by said finger keys, push rods that are moved longitudinally by said angle levers, a differential or selecting bar that is moved different extents by said push rods, and means for connecting said differential bar and certain of said stop devices, carriage releasing means and connections between said push rods and carriage releasing means.

9. In a typewriting machine and tabulating mechanism, the combination of a carriage, a rock-shaft, a stop carried by said rock shaft, a series of coöperating stops which extend at their free ends to different distances, and means for turning said rock shaft different distances, said means comprising a series of keys, angular levers actuated thereby, push rods, a differential bar actuated by said push rods, and connections from the differential bar to said rock shaft.

10. In a typewriting machine and tabulating mechanism, the combination of a carriage, a rock shaft, a stop carried by said rock shaft, a series of coöperating stops which extend at their free ends to different distances, means for turning said rock shaft different distances, said means comprising a series of keys, angular levers actuated thereby, push rods, a selecting bar actuated by said push rods, connections from the selecting bar to said rock shaft, and carriage releasing means with means for operating the same at the operation of any of said keys.

11. In a typewriting machine and tabulating mechanism, the combination of a carriage, a rock-shaft, a stop carried by said rock-shaft, a series of coöperating stops which extend at their free ends to different distances, means for turning said rock shaft different distances, said means comprising a series of keys, angular levers actuated thereby, push rods, a selecting bar actuated by said push rods, connections from the selecting bar to said rock shaft, and carriage releasing means with means for operating the same at the operation of any of said keys, said releasing means comprising a rock shaft, means associated with each push rod for turning said rock shaft and a releasing device.

12. In a typewriting machine and tabulating mechanism, the combination of a carriage, tabulating mechanism, key actuated means for controlling said tabulating mechanism, a vibratory controlling device adapted to be actuated by said carriage, means controlled by said key actuated mechanism for freeing the carriage from control of the escapement mechanism and placing it in control of said vibratory controlling device, means for automatically restoring the carriage to control of the escapement mechanism when the tabulating mechanism arrests the carriage in the selected position determined by said tabulating mechanism, and adjustable means associated with said vibratory device for varying the speed of the carriage when it is under control of said vibratory device.

13. In a typewriting machine and tabulating mechanism, the combination of a carriage, a column jumping mechanism for arresting the carriage at any desired columnar position without first arresting the carriage at a preceding columnar position or field, a feed rack, a pinion, means for effecting an engagement between said feed rack and pinion when said column jumping mechanism is actuated, and a vibratory carriage speed controlling device that is actuated by said pinion.

14. In a typewriting machine and tabulating mechanism, the combination of a carriage, a column jumping mechanism for arresting the carriage at any desired columnar position without first arresting the carriage at a preceding columnar position or field, a feed rack, a pinion, means for effecting an engagement between said feed rack and pinion when said column jumping mechanism is actuated, a vibratory carriage speed controlling device that is actuated by said pinion, and adjustable means that may be set to vary the resistance offered by said vibratory device to the movement of the carriage when it is under control of said vibratory device.

15. In a typewriting machine and tabulating mechanism, the combination of a carriage, column jumping mechanism for arresting the carriage at any desired columnar position or field without first arresting it at a preceding columnar position or field, denominational tabulating mechanism for arresting the carriage at any desired denominational position within the selected columnar field, and a carriage speed controlling device that is thrown into operation when either the column jumping or denominational tabulating mechanism is actuated.

16. In a typewriting machine and tabulating mechanism, the combination of a carriage, column jumping mechanism for arresting the carriage at any desired columnar position or field without first arresting it at a preceding columnar position or field, denominational tabulating mechanism for arresting the carriage at any desired denominational position within the selected columnar field, a carriage speed controlling device that is thrown into operation when either the column jumping or denominational tabulating mechanism is actuated, and adjustable means that may be set to vary the resistance offered by the speed controlling device to the movement of the carriage when the carriage is in control of said speed controlling device.

17. In a typewriting machine and tabulating mechanism, the combination of a carriage, column jumping mechanism for arresting the carriage at any desired columnar position or field without first arresting it at a preceding columnar position or field, denominational tabulating mechanism for arresting the carriage at any desired denominational position within the selected columnar field, a vibratory carriage speed controller that is operatively connected to the carriage to be operated thereby when either the column jumping or denominational tabulating mechanism is actuated.

18. In a typewriting machine and tabulating mechanism, the combination of a carriage, column jumping mechanism for arresting the carriage at any desired columnar position or field without first arresting it at a preceding columnar position or field, denominational tabulating mechanism for arresting the carriage at any desired denominational position within the selected columnar field, a vibratory carriage speed controller that is operatively connected to the carriage to be operated thereby when either the column jumping or denominational tabulating mechanism is actuated, said vibratory controller including a weight, and means to vary the position of the weight on the vibratory device.

19. In a typewriting machine, the combination of a carriage, a feed rack therefor, a pivoted lever, a pinion operatively connected to vibrate said lever, a gear for operating said pinion, a pivoted shiftable support that carries said gear, the pivotal center of said support being coincident with the pivotal axis of said pinion, so that the gear may move with its support and yet remain operatively connected to said pinion, and key operated means for moving said shiftable support to throw the gear into and out of operative connection with said feed rack.

20. In a typewriting machine, the combination of a carriage, a carriage feeding device, a pivoted feed rack, a pivoted lever, an adjustable weight carried by said lever, a pinion operatively connected to said lever to vibrate it, a gear for operating said pinion and which is adapted to mesh with said feed rack and to move it out of engagement with said carriage feeding device, a shiftable support carrying said gear, and key actuated means for shifting said movable support.

21. In a typewriting machine, the combination of a carriage, a carriage feeding device, a pivoted feed rack, a pivoted lever, a pinion operatively connected to said lever to vibrate it, a gear for operating said pinion and which is adapted to mesh with said feed rack and to move it out of engagement with said carriage feeding device, a pivoted shiftable support carrying said gear, the pivotal center of said support being coincident with the pivotal center of said pinion, so that the gear may move with its support and yet remain operatively connected to said pinion, and key actuated means for moving said shiftable support to throw the gear into and out of operative connection with said feed rack and to control the movement of the rack into and out of operative connection with said carriage feeding device.

22. In a typewriting machine and tabulating mechanism, the combination of a carriage, a feed rack therefor, a pivoted lever, a pinion operatively connected to vibrate said lever, a gear for operating said pinion, tabulating devices, key-actuated means for operating said tabulating devices and for throwing said gear into and out of operative connection with said feed rack, and a weight that is adjustable on said lever.

23. In a typewriting machine and tabulating mechanism, the combination of a carriage, a feed rack therefor, a pivoted lever, a pinion operatively connected to vibrate said lever, a gear for operating said pinion, a shiftable support that carries said gear whereby the gear may be thrown into and out of operative connection with said feed rack, tabulating devices, and key actuated means for operating said tabulating devices and for throwing said gear into and out of operative connection with said feed rack.

24. In a typewriting machine and tabulating mechanism, the combination of a carriage, a feed rack therefor, a pivoted lever, a pinion operatively connected to vibrate said lever, a gear for operating said pinion, a pivoted shiftable support that carries said gear, the pivotal center of said support being coincident with the pivotal axis of said pinion, so that the gear may move with its support and yet remain operatively connected to said pinion, tabulating devices, and key-actuated means for operating said tabulating devices and for moving said shiftable support to throw the gear into and out of operative connection with said feed rack.

25. In a typewriting machine, the combination of a carriage, a feed rack therefor, a vibratory lever having a slot therein, a pinion having a crank pin that extends into the slot in said lever, and means for rotating said pinion from said feed rack.

26. In a typewriting machine, the combination of a carriage, a feed rack therefor, a vibratory lever having a slot therein, a pinion having a crank pin that extends into the slot in said lever, a gear that co-acts with said pinion, and key controlled means for rotating said gear from said feed rack.

27. In a typewriting machine, the combination of a carriage, a feed rack therefor, a vibratory lever having a slot therein, an adjustable weight on said lever, a pinion having a crank pin that extends into the slot in said lever, means for rotating said pinion from said feed rack, and key actuated means for bringing the pinion and feed rack into coöperative relation.

28. In a typewriting machine and tabulating mechanism, the combination of a carriage, a feed rack therefor, tabulating devices, a vibratory lever having a slot therein, a pinion having a crank pin that extends into the slot in said lever, means for rotating said pinion from said feed rack, and means for bringing the pinion and feed rack into operative relation when said tabulating devices are actuated.

29. In a typewriting machine and tabulating mechanism, the combination of a carriage, a feed rack therefor, tabulating devices, a vibratory lever having a slot therein, a pinion having a crank pin that extends into the slot in said lever, a gear which is adapted to be moved into and out of mesh with said rack and which is operative to rotate said pinion, and means for bringing said gear and feed rack into coöperative relation when said tabulating devices are actuated.

30. In a typewriting machine and tabulating mechanism, the combination of a carriage, key actuated tabulating devices, means for controlling the run of the carriage, means for throwing said controlling means into operation when the tabulating devices are actuated, and means controlled by the run of the carriage for throwing said controlling means out of operation even though pressure be maintained on a depressed key of the key-actuated tabulating devices.

31. In a typewriting machine, the combination of a carriage, carriage feed mechanism, carriage releasing means comprising a key controlled cam for releasing the carriage from its feed mechanism, and means for affording an automatic reëngagement of the carriage with its feed mechanism without restoring said cam to its normal position.

32. In a typewriting machine and tabulating mechanism, the combination of a carriage, carriage feed mechanism, tabulating devices, a key therefor, means for controlling the speed of the carriage, means for releasing the carriage from its feed mechanism and for putting it in control of said speed controlling means when the tabulating devices are actuated, and means controlled by the run of the carriage for automatically restoring the carriage to control of its feed mechanism and for throwing the speed controlling means out of operation even though pressure be maintained on said key.

33. In a typewriting machine and tabulating mechanism, the combination of a carriage, carriage feed mechanism, tabulating devices, a tabulating key for actuating the same, means for controlling the speed of the carriage, means for releasing the carriage from its feed mechanism and for putting it in control of said speed controlling means when the tabulating key is actuated, and means for automatically restoring the carriage to control of its feed mechanism and for throwing the speed controlling means out of operation while pressure is maintained on the tabulating key.

34. In a typewriting machine and tabulating mechanism, the combination of a carriage, escapement mechanism, tabulating stops, a key for one of said stops, one of said stops being movable in the direction of the run of the carriage, carriage releasing means for operatively connecting the carriage with and for disconnecting it from the escapement mechanism, said carriage releasing means being operatively connected to said movable stop to afford an automatic actuation of the carriage releasing means to restore the carriage to the control of said escapement mechanism when said stops are brought into contact and while pressure is maintained on said key.

35. In a typewriting machine, the combination of a carriage, a feed rack, a pinion, hand actuated means for effecting an engagement and disengagement between said feed rack and pinion, a vibratory carriage speed controlling device that is actuated by said pinion, and means controlled by the run of the carriage for automatically disengaging the pinion from the feed rack.

36. In a typewriting machine, the combination of a carriage, a feed rack, a pinion, hand actuated means for effecting an engagement or disengagement between said feed rack and pinion, a vibratory carriage speed controlling device that is actuated by said pinion, adjustable means that may be set to vary the resistance offered by said vibratory device to the movement of the carriage when it is under control of said vibratory device, and means controlled by the run of the carriage for automatically effecting a disengagement between the feed rack and said pinion.

37. In a typewriting machine and tabulating mechanism, the combination of a carriage, a column jumping mechanism for arresting the carriage at any desired columnar position without first arresting the carriage at a preceding columnar position or field, a feed rack, a pinion, hand actuated means for effecting an engagement between said feed rack and pinion when said column jumping mechanism is actuated, a vibratory carriage speed controlling device that is actuated by said pinion, and means controlled by the run of the carriage for automatically disconnecting the pinion from said feed rack.

38. In a typewriting machine and tabulating mechanism, the combination of a carriage, column jumping mechanism for arresting the carriage at any desired columnar position or field without first arresting it at a preceding columnar position or field, denominational tabulating mechanism for arresting the carriage at any desired denominational position within the selected columnar field, a carriage speed controlling device that is thrown into operation when either the column jumping or denominational column jumping mechanism is actuated, and means for automatically throwing said carriage speed controlling device out of operation when the carriage has been arrested at the selected columnar field.

39. In a typewriting machine and tabulating mechanism, the combination of a carriage, column jumping mechanism for arresting the carriage at any desired columnar position or field without first arresting it at a preceding columnar position or field, a carriage speed controlling device that is thrown into operation when the column jumping mechanism is actuated, adjustable means that may be set to vary the resistance offered by the speed controlling device to the movement of the carriage when the carriage is in control of said speed controlling device, and means controlled by the run of the carriage for automatically throwing said speed controlling device out of operation.

40. In a typewriting machine and tabulating mechanism, the combination of a carriage, column jumping mechanism for arresting the carriage at any desired columnar position or field without first arresting it at a preceding columnar position or field, denominational tabulating mechanism for arresting the carriage at any desired denominational position within the selected columnar field, a carriage speed controlling device that is thrown into operation when either column jumping or denominational tabulating mechanism is actuated, adjustable means that may be set to vary the resistance offered by the speed controlling device to the movement of the carriage when the carriage is in control of said speed controlling device, and means controlled by the run of the carriage for automatically throwing said speed controlling device out of operation when the selected columnar field has been secured.

41. In a typewriting machine and tabulating mechanism, the combination of a carriage, column jumping mechanism for arresting the carriage at any desired columnar position or field without first arresting it at a preceding columnar position or field, denominational tabulating mechanism for arresting the carriage at any desired denominational position within the selected columnar field, a vibratory carriage speed controller that is operatively connected to the carriage to be operated thereby when either the column jumping or denominational tabulating mechanism is actuated, said vibratory controller including a weight, means to vary the position of the weight on the vibratory device, and means controller by the run of the carriage for automatically throwing said controlling device out of operation when the selected columnar field has been reached.

42. In a typewriting machine, the combination of a carriage, a feed rack therefor, a pivoted lever, a pinion operatively connected to vibrate said lever, a gear for operating said pinion, hand actuated means for throwing said gear into and out of operative connection with said feed rack, and means controlled by the run of the carriage for automatically throwing said gear out of operative connection with the feed rack.

43. In a typewriting machine, the combination of a carriage, a feed rack therefor, a pivoted lever, a pinion operatively connected to vibrate said lever, a gear for operating said pinion, hand actuated means for throwing said gear into and out of operative connection with said feed rack, a weight that is adjustable on said lever, and means controlled by the run of the carriage for automatically throwing the gear out of operative connection with the feed rack.

44. In a typewriting machine, the combination of a carriage, a feed rack therefor, a pivoted lever, a pinion operatively connected to vibrate said lever, a gear for operating said pinion, a shiftable support that carries said gear, whereby the gear may be thrown into and out of operative connection with said rack, key actuated means for moving said movable support, and means controlled by the run of the carriage for automatically affording a movement of said movable support to automatically disconnect the gear from the feed rack.

45. In a typewriting machine, the combination of a carriage, a feed rack therefor, a pivoted lever, a pinion operatively connected to vibrate said lever, a gear for operating said pinion, a pivoted shiftable support to carry said gear, the pivotal center of said support being coincident with the pivotal axis of said pinion so that the gear may move with its support and yet remain operatively connected to said pinion, key operated means for moving said shiftable support to throw the key into and out of operation with said feed rack, and means controlled by the run of the carriage for affording an automatic movement of the movable support to disconnect the pinion from the feed rack.

46. In a typewriting machine, the combination of a carriage, a carriage feeding device, a pivoted feed rack, a pivoted lever, a pinion operatively connected to said lever to vibrate it, a gear for operating said pinion and which is adapted to mesh with said feed rack to move it into and out of engagement with said carriage feeding device, a shiftable support carrying said gear, key actuated means for shifting said movable support, and means controlled by the run of the carriage for affording an automatic movement of said movable support to effect a disengagement between the feed rack and pinion, and an engagement of the rack with the carriage feeding device.

47. In a typewriting machine and tabulating mechanism, the combination of tabulating devices, key actuated means for operating said tabulating devices, a pivoted lever, a pinion operatively connected to vibrate said lever, means controlled by said key actuated means for operatively connecting said pinion with the carriage to operate the lever by the carriage, and means controlled by the run of the carriage for automatically disconnecting the pinion from the carriage.

48. In a typewriting machine and tabulating mechanism, the combination of a carriage, a feed rack therefor, a pivoted lever, a pinion operatively connected to vibrate said lever, a gear for operating said pinion, tabulating devices, key actuated means for operating said tabulating devices and for throwing said gear into and out of coöperation with the feed rack, and means controlled by the run of the carriage for automatically throwing said gear out of operative connection with said feed rack.

49. In a typewriting machine, the combination of a carriage, a feed rack therefor, a vibratory lever having a slot therein, an adjustable weight on said lever, a pinion having a crank pin that extends into the slot in said lever, means for rotating said pinion from said feed rack, key actuated means for bringing the pinion and feed rack into coöperative relation, and means controlled by the run of the carriage for throwing said feed rack and pinion out of operative relation.

50. In a typewriting machine and tabulating mechanism, the combination of a carriage, coöperating tabulating stops, and means for automatically relieving the coöperating stops from pressure one on another after they have been brought into coöperation to arrest the carriage and before they are out of coöperative relation.

51. In a typewriting machine and tabulating mechanism, the combination of a tabulating stop, and a stop that has a rolling contact with said tabulating stop as it is being restored to normal or non-coöperative position.

52. In a typewriting machine and tabulating mechanism, the combination of a tabulating stop, and a pivoted eccentric faced stop that coöperates with the tabulating stop and has a rolling contact therewith as it is being restored to normal position.

53. In a typewriting machine and tabulating mechanism, the combination of a carriage, coöperating tabulating stops, and a pivoted spring restored eccentric faced stop that coöperates with one of said tabulating stops and has a rolling contact therewith during the movement thereof to normal position.

54. In a typewriting machine and tabulating mechanism, the combination of a carriage, coöperating tabulating stops, a rock shaft that carries one of said stops and is movable longitudinally, and a stop that is adapted to have a rolling contact with the tabulating stop on the rock shaft.

55. In a typewriting machine and tabulating mechanism, the combination of a carriage, coöperating tabulating stops, a spring restored rock shaft that carries one of said stops and is movable longitudinally against the tension of its spring, and an arresting stop against which the stop on the rock shaft is moved when the tabulating stops are brought into coöperation and which has a rolling contact with the tabulating stop with which it coöperates as the latter moves to its normal position.

56. In a typewriting machine and tabulating mechanism, the combination of a carriage, tabulating stops, coöperating key actuated denominational stops, and a hinged frame in which said denominational stops are mounted.

57. In a typewriting machine and tabulating mechanism, the combination of a carriage, column stops carried thereby, a series of levers, denominational stops connected to said levers, tabulating keys, connections from said keys to said stop levers, and a hinged frame in which said stop levers are pivoted and which affords a movement of the denominational stops and stop levers away from the machine without dismounting the parts.

58. In a typewriting machine and tabulating mechanism, the combination of a carriage, column stops carried thereby, a series of levers, denominational stops connected to said levers, tabulating keys, connections from said keys to said stop levers, and a tabulator frame in which said stop levers are pivoted, pin and socket connections between the tabulator frame and the frame of the machine and which enable the tabulator frame to turn away from the machine without dismounting the parts and enable the tabulator frame to be readily mounted in place and detached when desired.

59. In a typewriting machine and tabulating mechanism, the combination of a carriage, and denominational stop mechanism including a tabulator frame, a series of denominational stop levers pivoted in said frame, the pivot for said levers being formed with a series of integral washer-like projections that maintain the levers properly spaced apart.

60. In a typewriting machine and tabulating mechanism, the combination of a carriage, and denominational stop mechanism including a tabulator frame, a series of denominational stop levers pivoted intermediate their ends in said frame, said stop levers each having an open slot bearing which coöperates with the pivot and affords a removal of any lever without removing the pivot or disconnecting the other levers.

61. In a typewriting machine and tabulating mechanism, the combination of a carriage, and denominational stop mechanism including a tabulator frame, a series of denominational stop levers pivoted in said frame, said stop levers each having an open slot bearing which coöperates with the pivot and a fixed detachable pin that coöperates with said levers to prevent an accidental displacement of the levers from their pivot.

62. In a typewriting machine and tabulating mechanism, the combination of a carriage and denominational stop mechanism including a tabulator frame, a series of denominational stop levers pivoted in said frame, said stop levers each having an open slot bearing which coöperates with the pivot, and a curved edge that is concentric to the pivot, and a fixed detachable pin that coöperates with the curved edge portions of said levers to afford a pivotal movement of the levers on their pivot and to prevent an accidental detachment of the levers.

63. In a typewriting machine and tabulating mechanism, the combination of a carriage, and denominational stop mechanism including a tabulator frame, a series of denominational stop levers pivoted in said frame, and an opening in the frame of the machine in which said tabulator frame is seated.

64. In a typewriting machine and tabulating mechanism, the combination of a carriage, and denominational stop mechanism including a tabulator frame, a series of denominational stop levers pivoted in said frame, and an opening in the top plate of the machine in which said tabulator frame is fitted and seated.

65. In a typewriting machine and tabulating mechanism, the combination of a carriage, and denominational stop mechanism including a tabulator frame, a series of denominational stop levers pivoted in said frame, an opening in the top plate of the machine in which said tabulator frame is fitted and seated, lugs on the top plate and screws that pass through the lugs and into the tabulator frame.

66. In a typewriting machine and tabulating mechanism, the combination with an angular guide plate having guide openings in one of its sides and guide slots in the other of its sides, tabulator key stems that work in the guide openings, and printing key levers that work in said slots.

67. In a typewriting machine and tabulating mechanism, the combination of a column stop bar, and spring pressed means for holding said stop bar in place and for affording a detachment of the bar when desired.

68. In a typewriting machine and tabulating mechanism, the combination of a column stop bar, bearings therefor, and a spring pressed locking device for locking said bar in its bearings and against removal therefrom.

69. In a typewriting machine and tabulating mechanism, the combination of a column stop bar, bearings for said bar, oppositely disposed recesses in said bearings, and locking devices adapted to be seated in said recesses to prevent the withdrawal of the bar, one of said locking devices being movable to afford the removal of the bar when desired.

70. In a typewriting machine and tabulating mechanism, the combination of a column stop bar, open mouthed bearings for said bar, oppositely disposed recesses in said bearings, and locking devices adapted to be seated in said recesses to prevent the withdrawal of the bar, one of said locking devices being spring-pressed and movable into and out of its recess to afford the removal of the bar when desired.

71. In a typewriting machine and tabulating mechanism, the combination of a column stop bar, bearings in which said bar is seated, means for affording an adjustment of the bar in the direction of its length, and a movable locking device for detaching the bar from its bearings when desired.

72. In a typewriting machine and tabulating mechanism, the combination of a column stop bar having angular end portions, open mouthed bearings adapted to receive the angular end portions of the bar and shaped to conform thereto, a fixed locking member at one end of the bar, and a movable locking device at the other end of the bar.

73. In a typewriting machine and tabulating mechanism, the combination of a column stop bar having angular end portions, open mouthed bearings adapted to receive the angular end portions of the bar and shaped to conform thereto, a fixed locking member at one end of the bar, means for adjusting said locking member to different set positions to afford a longitudinal adjustment of the column stop bar, and a movable spring-pressed locking device at the other end of the bar.

74. In a typewriting machine and tabulating mechanism, the combination of a column stop bar having angular end portions, open mouthed bearings adapted to receive the angular end portions of the bar and shaped to conform thereto, a locking member at one end of the bar, said locking member consisting of a cone-faced nut which is threaded on the bar and affords a longitudinal adjustment thereof, a locking recess in which the cone-face of the nut is received, and a locking device on the other end of the rod.

75. In a typewriting machine and tabulating mechanism, the combination of a column stop bar having angular end portions, open mouthed bearings adapted to receive the angular end portions of the bar and shaped to conform thereto, a locking member at one end of the bar, said locking member consisting of a cone-faced nut which is threaded on the bar and affords a longitudinal adjustment thereof, a locking recess in which the cone-face on the nut is received, and a spring-pressed locking device at the other end of said bar which is movable in the direction of the length of the bar, said locking device having a cone face, and one of the bearings having a recess in which said cone face is received.

76. In a typewriting machine and tabulating mechanism, the combination of a column stop bar having grooves therein, column stops adapted to be seated in said grooves and having lateral locking grooves therein, a locking bar adapted to be seated in the locking slots in the stops to prevent the withdrawal of the stops from the column stop bar, and means for affording a movement of the locking bar transversely to the length of the column stop bar, so that the locking bar may be moved into and out of the locking slots in the stops.

77. In a typewriting machine and tabulating mechanism, the combination of a column stop bar having grooves therein, column stops adapted to be seated in said grooves, and having lateral locking grooves therein, a locking bar adapted to be seated in the locking slots in the stops to prevent the withdrawal of the stops from the column stop bar, pin and slot connections between the locking bar and the stop bar, the slots being inclined to the length of the stop bar to afford a movement of the locking bar transversely to the length of the column stop bar, and into and out of the locking slots in the stops.

78. In a typewriting machine and tabulating mechanism, the combination of a carriage, feed mechanism therefor, key actuated column jumping mechanism for releasing the carriage and arresting it at any desired columnar field without first arresting the carriage at a preceding columnar field, and means for automatically restoring the carriage to the control of its feed mechanism while the key is held in the actuated position.

79. In a typewriting machine and tabulating mechanism, the combination of a carriage, feed mechanism therefor, key actuated column jumping mechanism for releasing the carriage and arresting it at any desired columnar field without first arresting the carriage at a preceding columnar field, and means for automatically restoring the carriage to the control of its feed mechanism by the run of the carriage and independent of the release of the key of said key actuated column jumping mechanism.

80. In a typewriting machine and tabulating mechanism, the combination of a carriage, feed mechanism therefor, key actuated column jumping mechanism for releasing the carriage and arresting it at any desired columnar field without first arresting the carriage at a preceding columnar field, said column jumping mechanism including tabulating stops, and means for automatically restoring the carriage to the control of its feed mechanism by the impact of said stops and independent of the release of the key of said key actuated column jumping mechanism.

81. The combination of a carriage, step-by-step feed mechanism therefor, tabulating mechanism, key actuated means for taking the carriage out of control of its step-by-step feed mechanism and putting it in the control of its tabulating mechanism, and means for automatically restoring the carriage to the control of its step-by-step feed mechanism while the key of said key actuated means is held in the actuated position.

82. The combination of a carriage, a feed rack for the carriage, coöperating step-by-step carriage feeding devices, tabulating mechanism, key actuated means for operating said tabulating mechanism and for disengaging the feed rack from its coöperating step-by-step feeding devices, and means for automatically restoring connection between the feed rack and its coöperating feeding devices while the key of said key actuated means is held in the actuated position.

83. The combination of a carriage, a feed rack therefor, coöperating feeding devices, tabulator stops, key actuated means for raising the rack out of engagement with its feeding devices and for bringing the tabulator stop into coöperative relation, and means for automatically dropping the rack into reëngagement with its feeding devices while the pressure is maintained on the actuated key of said key actuated means.

84. The combination of a carriage, a feed rack therefor, coöperating feeding devices, a cam for releasing the rack from said feeding devices, key actuated controlling means for bringing the tabulator stops into coöperative relation and for actuating said cam, and means for automatically disconnecting the cam from said feed rack by the run of the carriage and allowing the rack to reëngage its coöperating feeding devices.

85. The combination of a carriage, a feed rack therefor, coöperating feeding devices, a cam for releasing the rack from said feeding devices, tabulating stops, key actuated controlling means for bringing said stops into coöperative relation and for actuating said cam, and means controlled by the impact of the tabulating stops for automatically removing the cam from operative relation with the feed rack and allowing the feed rack to reëngage its coöperating feeding devices.

86. In a typewriting machine and tabulating mechanism, the combination of a carriage, a tabulating stop, a coöperating tabulating stop, a shaft which turns different extents and is also movable longitudinally and carries one of said stops, a carriage releasing device carried by said shaft, and key actuated means for turning said shaft different extents.

87. In a typewriting machine and tabulating mechanism, the combination of a carriage, feed mechanism therefor, coöperating tabulating stops, one of which receives a limited movement in the direction of the run of the carriage, carriage releasing means that are thrown out of operation to allow the carriage to be controlled by its feed mechanism when said last mentioned stop is moved in the direction of the run of the carriage, and carriage speed controlling means that are controlled by said carriage releasing means, to throw the speed controlling means into operation when the carriage is out of control of its feed mechanism and to automatically throw the speed controlling means out of operation when the carriage is under the control of its feed mechanism.

88. In a typewriting machine and tabulating mechanism, the combination of a carriage, feed mechanism therefor, key actuated column jumping mechanism for releasing the carriage and arresting it at any desired columnar field without first arresting the carriage at a preceding columnar field, means for automatically restoring the carriage to the control of its feed mechanism without releasing pressure on the actuated key, carriage speed controlling means, and means for throwing the speed controlling means into operation when the carriage is released from its feed mechanism and for throwing said speed controlling means out of operation when the carriage is in control of its feed mechanism.

89. The combination of a carriage, step-by-step feed mechanism therefor, tabulating mechanism, key actuated means for taking the carriage out of control of its step-by-step feed mechanism and putting it in the control of its tabulating mechanism, means for automatically restoring the carriage to the control of its step-by-step feed mechanism without releasing pressure on the actuated key of said key actuated means, carriage speed controlling means, and means for throwing the speed controlling means into operation when the carriage is out of the control of its step-by-step feed mechanism and for throwing the speed controlling means out of operation when the carriage is in the control of its step-by-step feeding devices.

90. The combination of a carriage, a feed rack therefor, coöperating feeding devices, tabulating stops, key actuated means for raising the rack out of engagement with its feeding devices and for bringing the tabulator stop into coöperative relation, means for automatically dropping the rack into reëngagement with its feeding devices without releasing pressure on the actuated key of said key actuated means, carriage speed controlling means, and means for throwing said speed controlling means into operation when the feed rack is raised and for throwing said speed controlling means out of operation when the feed rack is lowered.

91. The combination of a carriage, a feed rack therefor, coöperating feeding devices, a cam for releasing the rack from said feeding devices, tabulating stops, key actuated controlling means for bringing said stops into coöperative relation and for actuating said cam, means for automatically disconnecting the cam from said feed rack by the run of the carriage and allowing the rack to reëngage its coöperating feeding devices, carriage speed controlling means, and means for throwing the speed controlling means into operation when the feed rack is released from its coöperating feeding devices and for throwing said speed controlling means out of operation when said feed rack is in engagement with its feeding mechanism.

92. The combination of a carriage, a feed rack therefor, coöperating feeding devices, a cam for releasing the rack from said feeding devices, tabulating stops, key actuated controlling means for bringing said stops into coöperative relation and for actuating said cam, means controlled by the impact of the tabulating stops for automatically removing the cam from operative relation with the feed rack and allowing the feed rack to reëngage its coöperating feeding devices, carriage speed controlling means, and means for throwing the speed controlling means into operation when the feed rack is released from its coöperating feeding devices and for throwing said speed controlling means out of operation when said feed rack is in engagement with its feeding mechanism.

93. A bifurcated tabulating stop having a body portion and a set reinforcing extension that is off-set laterally from the stop, and an engaging portion at the body portion of the stop and at the off-set portion thereof.

94. A tabulating stop having parallel engaging ribs in the same plane and an off-set parallel engaging rib.

95. A stop rod grooved in opposite sides thereof, a stop having the body portion of a thickness corresponding substantially to the width of a groove in the bar and which engages in grooves on opposite sides of the bar, and an integral off-set portion with an engaging projection carried thereby that likewise engages in a groove in the rod.

96. A stop rod having grooves on opposite sides thereof, a bifurcated stop that straddles the rod and takes into the grooves at the bifurcated portion of the stop, and a thickened portion of the stop that projects laterally from the bifurcated portion thereof.

97. A stop rod having grooves on opposite sides thereof, a bifurcated stop that straddles the rod and takes into the grooves at the bifurcated portion of the stop, and a thickened portion of the stop that projects laterally from the bifurcated portion thereof and carries an engaging projection that takes into a groove in said rod.

98. In a typewriting machine, the combination of a carriage, a single set of column stops, and column determining and denominational determining tabulating mechanisms both coöperative with each of said stops, the column determining mechanism coöperating with one column stop to determine the column field and the denominational determining mechanism coöperating when next actuated with the next column stop so that the carriage may be arrested for writing in the first part of a column and then arrested at any desired denominational position within the same column.

99. In a typewriting machine, the combination of a carriage, column stops, denominational stop devices which coöperate therewith, column selecting stop devices which also coöperate with the column stops and which are situated at a point where each column stop must pass the denominational stop devices before it can coöperate with the column selecting device.

100. In a typewriting machine, the combination of a carriage, column stops, key actuated denominational stops which coöperate therewith, a key actuated column selecting stop which also coöperates with said column stops and which is situated at a point where each column stop must pass the denominational stops before it can coöperate with the column selecting stop.

101. In a typewriting machine, the combination of a carriage, column stops, key actuated denominational stops which coöperate therewith, a key actuated column selecting stop which also coöperates with said column stops, said column selecting stop being off-set to one side of the denominational stops.

102. In a typewriting machine, the combination of a carriage, column stops carried by said carriage, key actuated denominational stops which coöperate therewith, a key actuated column selecting stop that is movable to different extents transversely of the travel of the column stops, and which is situated several letter space distances to the left of the denominational stops.

103. In a typewriting machine, the combination of a carriage, column stops carried by said carriage, key actuated denominational stops which coöperate therewith, a key actuated column selecting stop that is movable to different extents transversely of the travel of the column stops, the construction and arrangement of the parts being such that the carriage may be arrested by the column selecting stop to afford writing in a column and may then be arrested by the denominational stop at any desired denominational position within the same column.

104. In a typewriting machine, the combination of a power driven carriage; speed controlling means for said carriage, said speed controlling means comprising a vibratory device, and an automatically operating regulating device carried thereby, and means for throwing said controlling means into and out of coöperation with the carriage.

105. In a typewriting machine, the combination of a carriage; speed controlling means for said carriage, said speed controlling means comprising a vibratory device and an automatically operating spring pressed regulating weight carried thereby; and key actuated means for throwing said controlling means into and out of coöperation with the carriage.

106. In a typewriting machine, the combination of a carriage; speed controlling means for said carriage, said speed controlling means comprising a pivoted vibratory device, a weight that automatically moves on said vibratory device to and from the pivotal center thereof, and means for throwing said controlling means into and out of coöperation with said carriage.

107. In a typewriting machine, the combination of a carriage; speed controlling means therefor, said speed controlling means comprising a pivoted vibratory device, a spring pressed weight that automatically moves on said vibratory device to and from the pivotal center thereof depending on the speed of the vibratory device, and hand operated means for throwing said controlling means into and out of coöperation with said carriage to be operated thereby.

108. In a typewriting machine, the combination of a carriage, a rotary driving device adapted to be actuated by the carriage, means for operatively connecting the rotary device to and disconnecting it from the carriage, a carriage speed controlling vibratory device actuated by said rotary device, and a weight that is movable automatically to different positions on said vibratory device.

109. In a typewriting machine, the combination of a carriage, a rotary driving device adapted to be actuated by the carriage, hand actuated means for operatively connecting the rotary device to and disconnecting it from the carriage, a pivoted vibratory carriage speed controlling lever actuated by said rotary device, and a spring-pressed weight mounted on said lever and movable automatically toward and from the pivotal center thereof.

110. In a typewriting machine, the combination of a carriage, a feed rack therefor, a pinion adapted to be thrown into and out of mesh with said rack, a rotary driving device adapted to be actuated by the pinion, a carriage speed controlling vibratory device actuated by said rotary device, and a weight that is movable automatically to different positions on said vibratory device.

111. In a typewriting machine and tabulating mechanism, the combination of a carriage; tabulating devices; carriage speed controlling means for the carriage, said speed controlling means comprising a vibratory device and an automatically operated regulating device carried thereby; and means for throwing the carriage speed controlling means into operation when the tabulating devices are actuated.

112. In a typewriting machine and tabulating mechanism, the combination of a carriage; tabulating devices; carriage speed controlling means for said carriage, said carriage speed controlling means comprising a vibratory device and an automatically operated spring-pressed regulating weight carried thereby; and key actuated means for automatically throwing the controlling means into and out of coöperation with the carriage when the tabulating devices are actuated.

113. In a typewriting machine and tabulating mechanism, the combination of a carriage; carriage releasing devices; tabulating devices; carriage speed controlling means for the carriage, said speed controlling means comprising a pivoted vibratory device, and a weight automatically movable on said vibratory device to and from the pivotal center thereof; and key-actuated means for automatically throwing the carriage controlling means into operation when the carriage is released and the tabulating devices are actuated.

114. In a typewriting machine and tabulating mechanism, the combination of a carriage; tabulating devices; carriage speed controlling means for said carriage, said carriage speed controlling means comprising a vibratory device, and a spring-pressed weight that automatically moves on said vibratory device to and from the pivotal center thereof distances depending on the speed of the vibratory device, and key-actuated means for automatically throwing said controlling means into coöperation with the carriage to be operated thereby when the tabulating devices are actuated.

115. In a typewriting machine and tabulating mechanism, the combination of a carriage, tabulating devices, a rotary driving device adapted to be actuated by the carriage, means for operatively connecting the rotary device to the carriage when the tabulating devices are actuated, a carriage speed controlling vibratory device actuated by said rotary device, and a weight that is movable automatically to different positions on said vibratory device.

116. In a typewriting machine and tabulating mechanism, the combination of a carriage, key actuated tabulating devices, a rotary driving device that is normally disconnected from but is adapted to be actuated by the carriage, means for operatively connecting the rotary device to the carriage when the key actuated tabulating devices are operated, a pivoted vibratory carriage speed controlling lever actuated by said rotary device, and a spring-pressed weight mounted on said lever and movable automatically to and from the pivotal center thereof.

117. In a typewriting machine and tabulating mechanism, the combination of a carriage, tabulating devices, a feed rack for the carriage, a pinion adapted to be thrown into and out of mesh with said rack, a rotary driving device adapted to be actuated by said pinion, a carriage speed controlling vibratory device actuated by said rotary device, a weight that is movable automatically to different positions on said vibratory device, and key-actuated means for operating said tabulating devices and for automatically throwing said pinion into and out of mesh with said feed rack.

118. In a typewriting machine, the combination of a power driven carriage; speed controlling means for said carriage, said speed controlling means comprising a vibratory device, an automatically operating regulating device carried thereby; hand actuated means for adjusting said automatically operating regulating device; and means for throwing said controlling means into and out of coöperation with the carriage.

119. In a typewriting machine, the combination of a carriage; speed controlling means for said carriage, said speed controlling means comprising a vibratory device, an automatically operating spring pressed regulating weight carried thereby; hand actuated means for adjusting the normal position of said regulating weight; and key actuated means for throwing said controlling means into and out of coöperation with the carriage.

120. In a typewriting machine, the combination of a carriage; speed controlling means for said carriage, said speed controlling means comprising a pivoted vibratory device, a weight that automatically moves on said vibratory device to and from the pivotal center thereof; means for affording an adjustment of the weight to different normal positions; and means for throwing said controlling means into and out of coöperation with said carriage.

121 In a typewriting machine, the combination of a carriage; speed controlling means therefor, said speed controlling means comprising a pivoted vibratory device, a spring pressed weight that automatically moves on said vibratory device to and from the pivotal center thereof depending on the speed of the vibratory device; hand actuated means for affording an adjustment of the weight to different normal position; and hand operated means for throwing said controlling means into and out of coöperation with said carriage to be operated thereby.

122. In a typewriting machine, the combination of a carriage, a rotary driving device adapted to be actuated by the carriage, means for operatively connecting the rotary device to and disconnecting it from the carriage, a carriage speed controlling vibratory device actuated by said rotary device, a weight that is movable automatically to different positions on said vibratory device, and means for adjusting the weight to different normal positions on said vibratory device.

123. In a typewriting machine, the combination of a carriage; step-by-step feed mechanism therefor; means for controlling the speed of the carriage when it is freed from its step-by-step feed mechanism, said means comprising a device that is automatically moved different distances depending on the speed of the carriage; and hand actuated adjustable means for positioning said device in different normal positions.

124. In a typewriting machine and tabulating mechanism, the combination of a carriage, a series of column stops, and a multiple column selecting stop having a series of stop faces, one for each of said column stops, and key actuated means for bringing about the the coöperation between any column stop and the corresponding stop face on the multiple selecting stop, in order to arrest the carriage at any desired columnar position at the end of an uninterrupted run of the carriage.

125. In a typewriting machine and tabulating mechanism, the combination of a carriage, a series of column selecting stops arranged with their working faces in the same vertical plane fore and aft of the machine, and means for coöperating with a selected one of the series of column selecting stops to arrest the carriage at a selected columnar field at the end of an uninterrupted run of the carriage.

126. In a typewriting machine and tabulating mechanism, the combination of a carriage, a series of column stops, a multiple column selecting stop, the engaging faces of which are all in the same plane fore and aft of the machine, and key actuated means for bringing any desired engaging face of the column selecting stop and the corresponding column stop into coöperation whereby the carriage may be arrested at any desired columnar field at the end of an uninterrupted run of the carriage.

127. In a typewriting machine and tabulating mechanism, the combination of a carriage, a series of column stops, a multiple column selecting stop having a series of stop faces, one for each column, all of said stop faces being in the same plane fore and aft of the machine, and key actuated means for effecting different extents of relative movement between said column stops and said multiple stop to bring a predetermined stop face and a predetermined column stop into coöperative relation in order to arrest the carriage at a selected columnar field at the end of an uninterrupted run of the carriage.

128. In a typewriting machine and tabulating mechanism, the combination of a carriage, a series of column stops, a rotary multiple column selecting stop having a series of stop faces, one for each column, all of said stop faces being in the same plane fore and aft of the machine, and key actuated means for effecting different extents of rotary movement of said multiple column selecting stop in order to bring any desired stop face thereon into coöperation with the corresponding column stop to arrest the carriage at a predetermined columnar field at the end of an uninterrupted run of the carriage.

Signed at the borough of Manhattan, city of New York, in the county of New York, and State of New York, this 19th day of January, A. D. 1906.

OSCAR WOODWARD.

Witnesses:
E. M. WELLS,
M. F. HANNWEBER.